US007351787B2

(12) United States Patent
Faure et al.

(10) Patent No.: US 7,351,787 B2
(45) Date of Patent: Apr. 1, 2008

(54) PROCESS FOR THE PREPARATION OF ACTIVATED POLYETHYLENE GLYCOLS

(75) Inventors: Marie-Pierre Faure, Ville St. Laurent (CA); Kirill Shingel, Brossard (Longueuil) (CA)

(73) Assignee: Bioartificial Gel Technologies, Inc., Montreal, Quebec (CA)

( * ) Notice: Subject to any disclaimer, the term of this patent is extended or adjusted under 35 U.S.C. 154(b) by 329 days.

(21) Appl. No.: 11/071,877

(22) Filed: Mar. 3, 2005

(65) Prior Publication Data

US 2005/0228187 A1  Oct. 13, 2005

Related U.S. Application Data

(60) Provisional application No. 60/550,817, filed on Mar. 5, 2004.

(51) Int. Cl.
*C08G 65/48* (2006.01)
(52) U.S. Cl. .................................................. 528/361
(58) Field of Classification Search ................ 528/361
See application file for complete search history.

(56) References Cited

U.S. PATENT DOCUMENTS

| | | | |
|---|---|---|---|
| 3,463,862 A | 8/1969 | Mazza | 523/103 |
| 4,002,531 A | 1/1977 | Royer | 195/68 |
| 4,101,380 A | 7/1978 | Rubinstein et al. | 195/63 |
| 4,161,948 A | 7/1979 | Bichon | 128/156 |
| 4,179,337 A | 12/1979 | Davis et al. | 435/181 |
| 4,264,155 A | 4/1981 | Miyata | 351/160 H |
| 4,388,428 A | 6/1983 | Kuzma et al. | 523/106 |
| 4,464,468 A | 8/1984 | Avrameas et al. | 435/177 |
| 4,650,616 A | 3/1987 | Wajs | 264/2.6 |
| 4,752,627 A | 6/1988 | Froix | 523/106 |
| 4,791,192 A | 12/1988 | Nakagawa et al. | 530/399 |
| 4,879,072 A | 11/1989 | Bourset et al. | 264/1.4 |
| 5,039,540 A | 8/1991 | Ecanow | 426/385 |
| 5,051,406 A | 9/1991 | Satoh | 514/21 |
| 5,079,018 A | 1/1992 | Ecanow | 426/385 |
| 5,114,627 A | 5/1992 | Civerchia | 264/1.1 |
| 5,122,614 A | 6/1992 | Zalipsky | 548/520 |
| RE33,997 E | 7/1992 | Kuzma et al. | 523/106 |
| 5,183,660 A | 2/1993 | Ikeda et al. | 424/94.3 |
| 5,185,368 A | 2/1993 | Peter et al. | 514/476 |
| 5,214,131 A | 5/1993 | Sano et al. | 530/345 |
| 5,229,366 A | 7/1993 | Tsukada et al. | 514/12 |
| 5,235,028 A | 8/1993 | Barany et al. | 528/335 |
| 5,252,714 A | 10/1993 | Harris et al. | 530/391.9 |
| 5,281,698 A | 1/1994 | Nitecki | 530/351 |
| 5,286,637 A | 2/1994 | Veronese et al. | 435/183 |
| 5,298,410 A | 3/1994 | Phillips et al. | 435/188 |
| 5,298,643 A | 3/1994 | Greenwald | 558/6 |
| 5,321,095 A | 6/1994 | Greenwald | 525/404 |
| 5,324,844 A | 6/1994 | Zalipsky | 548/520 |
| 5,334,382 A | 8/1994 | Phillips et al. | 424/94.3 |
| 5,342,940 A | 8/1994 | Ono et al. | 544/218 |
| 5,349,001 A | 9/1994 | Greenwald et al. | 525/408 |
| 5,382,657 A | 1/1995 | Karasiewicz et al. | 530/351 |
| 5,389,381 A | 2/1995 | Phillips et al. | 424/94.3 |
| 5,405,877 A | 4/1995 | Greenwald et al. | 514/772.3 |
| 5,446,090 A | 8/1995 | Harris | 525/54.1 |
| 5,468,478 A | 11/1995 | Saifer et al. | 427/78.27 |
| 5,514,572 A | 5/1996 | Veronese et al. | 435/180 |
| 5,529,915 A | 6/1996 | Phillips et al. | 435/188 |
| 5,539,063 A | 7/1996 | Hakimi et al. | 525/403 |
| 5,545,698 A | 8/1996 | Barany et al. | 525/420 |
| 5,556,948 A | 9/1996 | Tagawa et al. | 530/391.9 |
| 5,559,213 A | 9/1996 | Hakimi et al. | 530/351 |
| 5,567,422 A | 10/1996 | Greenwald | 424/78.3 |
| 5,595,732 A | 1/1997 | Hakini et al. | 424/85.7 |
| 5,605,976 A | 2/1997 | Martinez et al. | 525/408 |
| 5,637,749 A | 6/1997 | Greenwald | 558/6 |
| 5,650,234 A | 7/1997 | Dolence et al. | 428/447 |
| 5,681,567 A | 10/1997 | Martinez et al. | 424/178.1 |
| 5,733,563 A | 3/1998 | Fortier | 424/422 |

(Continued)

FOREIGN PATENT DOCUMENTS

CA          2331139          11/1999

(Continued)

OTHER PUBLICATIONS

Fortier et al. "Surface modification of horseradish peroxidase with poly(ethylene glycol)s of various molecular masses" Biotechnol. Appl. Biochem. 1993, vol. 17, pp. 115-130.*
International Search Report for International Application Serial No. PCT/CA2005/000342, dated May 18, 2005, 3 pages.
Fortier, G. et al. (1993), "Surface modification of horseradish peroxidase with poly(ethylene glycols)s of various molecular masses," *Biotechnol. Appl. Biochem.*, vol. 17, pp. 115-130.
Hai, T.T. et al. (1999), "Polymerization of Diaspirin Crosslinked Hemoglobin (DCLHb) with PEG Activated with Benzenesulfonate Bearing Electron-Withdrawing Groups," *Tetrahdron*, vol. 55, pp. 2147-2156.
Mehvar, R. (2000), "Modulation of the Pharmacokinetics and Pharmacodynamics of Proteins by Polyethylene Glycol Conjugation," *J. Pharm. Pharmaceut. Sci.*, vol. 3, No. 1, pp. 125-136.
Morpurgo, M. et al. (1996), "Preparation and Characterization of Poly(ethylene glycol) Vinyl Sulfone," *Bioconjugate Chem.*, vol. 7, pp. 363-368.

(Continued)

*Primary Examiner*—Rebecca Anderson
*Assistant Examiner*—Joseph R. Kosack
(74) *Attorney, Agent, or Firm*—Kirkpatrick & Lockhart Preston Gates Ellis LLP

(57) ABSTRACT

A process for preparing activated polyethylene glycols is disclosed. In some embodiments, the process includes reacting a molten polyethylene glycol with an activator. In other embodiments, the process includes reacting a polyethylene glycol with an activator in the absence of a solvent. The process may be carried out in an inert gas atmosphere, at a temperature at least 10° C. above the melting point of polyethylene glycol, and/or with the activator provided in molar excess of the polyethylene glycol. The invention further provides activated polyethylene glycols produced by this process and their use in a variety of pharmaceutical, medical, cosmetic and chemical applications.

20 Claims, 10 Drawing Sheets

U.S. PATENT DOCUMENTS

| | | | |
|---|---|---|---|
| 5,747,646 A | 5/1998 | Hakimi et al. | 530/351 |
| 5,792,834 A | 8/1998 | Hakimi et al. | 530/351 |
| 5,834,594 A | 11/1998 | Hakimi et al. | 530/351 |
| 5,849,860 A | 12/1998 | Hakimi et al. | 528/370 |
| 5,900,461 A | 5/1999 | Harris | 525/54.11 |
| 5,932,462 A | 8/1999 | Harris et al. | 435/188 |
| 5,973,069 A | 10/1999 | Kataoka et al. | 525/54.2 |
| 6,214,966 B1 | 4/2001 | Harris | 528/322 |
| 6,348,558 B1 | 2/2002 | Harris et al. | 428/196 |
| 6,515,100 B2 | 2/2003 | Harris | 528/322 |
| 6,773,703 B1 | 8/2004 | Ettner et al. | 424/94.1 |
| 2003/0083389 A1 | 5/2003 | Kao et al. | 516/98 |
| 2004/0082716 A1 | 4/2004 | Faure et al. | 525/54.1 |
| 2005/0080206 A1 | 4/2005 | Faure et al. | 525/525 |

FOREIGN PATENT DOCUMENTS

| | | |
|---|---|---|
| EP | 1 055 685 | 11/2000 |
| WO | WO 01/74928 | 10/2001 |

OTHER PUBLICATIONS

Roberts, M.J. et al. (2002), "Chemistry for peptide and protein PEGylation," *Advanced Drug Delivery Reviews*, vol. 54, pp. 459-476.

D'Urso, E.M. et al. (1994), "New Bioartificial Polymeric Material: Poly(ethylene glycol) Cross-Linked with Albumin. I. Synthesis and Swelling Properties," vol. 9, pp. 367-387.

Anderson, W.L. et al. (1988), "Polymer modification of antibody to eliminate immune complex and Fc binding," *Journal of Immunology Methods*, 109(1):37-42.

Beauchamp, C.O. et al. (1983), "A New Procedure for the Synthesis of Polyethylene Glycol-Protein Adducts; Effects on Function, Receptor Recognition, and Clearance of Superoxide Dimutase, Lactoferrin, and $\alpha_2$-Macroglobulin," *Analytical Biochemistry*, 131(1):25-33.

Delgado, C. et al. (1990), "Coupling of Poly(ethylene glycol) to Albumin under Very Mild Conditions by Activation with Tresyl Chloride: Characterization of the Conjugate by Partitioning in Aqueous Two-Phase Systems," *Biotechnology and Applied Biochemistry*, 12:119-128.

Nishimura, H. et al. (1983), "Modification of Batroxobin with Activated Polyethylene Glycol: Reduction of Binding Ability Towards Anti-Batroxobin Antibody and Retention of Defibrinogenation Activity in Circulation of Preimmunized Dogs," *Life Sciences*, 33:1467-1473.

Veronese, F.M. et al. (1985), "Surface Modification of Proteins, Activation of Monomethoxy-Polyethylene Glycols by Phenylchloroformates and Modification of Ribonuclease and Superoxide Dismutase," *Applied Biochemistry and Biotechnology*, 11(2):141-152.

Wirth, P. et al. (1991), "Chemical Modification of Horseradish Peroxidase with Ethanal-Methoxypolyethylene Glycol: Solubility in Organic Solvents, Activity, and Properties," *Bioorganic Chemistry*, 19(2):133-142.

Zaplisky, S. et al. (1990), "Facile Synthesis of α-Hydroxy-ω-Carboxymethylpolyethylene Oxide," *Journal of Bioactive and Compatible Polymers*, 5(2):227-231.

Zaplisky, S. (1995), "Functionalized Poly(ethylene glycol) for Preparation of Biologically Relevant Conjugates," *Bioconugate Chemistry*, 6:150-165.

International Search Report for International Application Serial No. PCT/CA2005/000342, dated Jun. 7, 2005, 3 pages.

Sartore et al. (1991), "Enzyme Modification by MPEG with an Amino Acid Peptide as Spacer Arms," *Appl. Biochem. Biotechnol.*, vol. 27, pp. 45-54.

* cited by examiner

US 7,351,787 B2

PROCESS FOR THE PREPARATION OF ACTIVATED POLYETHYLENE GLYCOLS

CROSS-REFERENCE TO RELATED APPLICATIONS

This application claims priority to and the benefit of commonly-owned U.S. Provisional Patent Application No. 60/550,817, filed on Mar. 5, 2004, the entire disclosure of which is incorporated by reference herein.

TECHNICAL FIELD

The present invention generally relates to a process for the preparation of activated polyethylene glycols. More specifically, the present invention relates to a process for the preparation of activated polyethylene glycols without the use of a solvent. The invention further provides activated polyethylene glycols produced by this process and their use in a variety of pharmaceutical, medical, cosmetic and chemical applications.

BACKGROUND

Polyethylene glycol (PEG) is a polymer having the structure $H(O-CH_2-CH_2)_n-OH$. It is generally synthesized by the ring-opening polymerization of ethylene oxide. PEGs of different molecular weight have previously been used in a number of biomedical applications, including processes known as "pegylation," in which PEG is attached to a protein to extend its activity.

To effect covalent attachment of polyethylene glycol to a protein, the hydroxyl end-groups of the polymer need to be converted to reactive functional groups. This process is frequently referred to as "activation" and the product is called "activated PEG." Following activation, the reactive functional end-groups of the activated PEG can then react with various functional groups on a variety of molecules, e.g., proteins.

Several chemical procedures have been developed to prepare activated PEGs. For example, PEGs have been successfully activated by reaction with 1,1-carbonyl-di-imidazole, cyanuric chloride, tresyl chloride, 2,4,5-trichlorophenyl chloroformate, 4-nitrophenyl chloroformate, and various N-hydroxy-succinimide derivatives, as well as by the Moffatt-Swern reaction. See Beauchamp et al., *Anal. Biochem.*, 131: 25 (1983); Nashimura et al., *Life Sci.*, 33: 1467 (1983); Delgado et al., *Appl. Biochem.*, 12: 119 (1990); Wirth et al., *Bioorg. Chem.*, 19: 133, (1991); Veronese et al., *Biochem. Biotechnol.*, 11: 141 (1985); Sartore et al., *Biochem. Biotechnol.*, 27: 45 (1991); Anderson et al., *J. Immunol. Methods*, 109: 37 (1988); and Zalipsky et al., *J. Bioact. Compat. Polym.*, 5: 227 (1990).

The activation of PEGs with 4-nitrophenyl chloroformate to generate PEG-dinitrophenyl carbonates has been described by Fortier and Laliberte. See Fortier et al., *Biotech. Appl. Biochem.*, 17: 115 (1993). The reaction was carried out in acetonitrile containing triethylamine (TEA) for 5 hours at 60° C. To keep an anhydrous environment during the reaction, it was necessary to use a cumbersome Soxhlet extraction system.

International Publication No. WO 03/018665 describes an alternative method for preparing activated PEGs. The method involves a reaction carried out at room temperature using an aprotic solvent, such as methylene chloride ($CH_2Cl_2$), in the presence of a catalyst, such as dimethylaminopyridine (DMAP). The use of solvents in both the reaction itself and the subsequent extraction steps to remove by-products, such as the toxic hydrochloric acid salt of DMAP, increases the cost of the final product.

Thus there is a need to develop an efficient, low-cost, and environmentally friendly method for preparing activated PEGs that will minimize or eliminate the use of solvents, catalysts, toxic compounds, cumbersome equipment, and/or purification steps.

SUMMARY OF THE INVENTION

It has been discovered that activated polyethylene glycols can be prepared via a process that eliminates or minimizes the use of solvents, catalysts, toxic compounds, cumbersome equipment, and/or purification steps. In addition, the process can prepare polyethylene glycols with a high degree of activation. Generally, the invention is a process for preparing activated polyethylene glycols that includes reacting a polyethylene glycol with an activator, which transfers a leaving group to the polyethylene glycol. The process is conducted under solvent-free conditions such that the polyethylene glycol serves as the reaction medium, e.g., the polyethylene glycol is in a molten or liquid state.

According to one aspect of the invention, a process for preparing an activated polyethylene glycol may include the steps of providing a molten polyethylene glycol and reacting the molten polyethylene glycol with an activator. The molten polyethylene glycol may have a general formula of $M-(OCH_2CH_2)_n-O-M$, wherein n may be an integer greater than 2, and M may be selected from the group consisting of H, Li, Na, K, Rb, and Cs. The activator may have a general formula of Y-Q-X, wherein X and Y independently may be a leaving group, and Q may be selected from the group consisting of —C(O)—, —$SO_2$—, >P(O)—, and -A-R-B-, wherein A and B independently may be —C(O)—, —$SO_2$—, or >P(O)—, and R may be selected from the group consisting of a lower alkyl group, a lower branched alkyl group, an aryl group, an aralkyl group, —$(CHR_1)_t$—, —O—$(CHR_1)_t$—O—, —S—$(CHR_1)_t$—S—, —O—$(CHR_1)_t$—S—, —S—$(CHR_1)_t$—O—, —O—$(CHR_1)_t$—$R_2C=CR_3$—$(CHR_4)_t$—O—, —S—$(CHR_1)_t$—$R_2C=CR_3$—$(CHR_4)_t$—S—, —O—$(CHR_1)_t$—$R_2C=CR_3$—$(CHR_4)_t$—S—, and —S—$(CHR_1)_t$—$R_2C=CR_3$—$(CHR_4)_t$—O—. The variables $R_1$, $R_2$, $R_3$, and $R_4$ may be independently selected from the group consisting of a hydrogen atom, a lower alkyl group, a lower branched alkyl group, an aryl group, and an aralkyl group, and t may be 1, 2, or 3. The activated polyethylene glycol prepared according to this aspect of the invention may have a general formula of Y-Q-$(OCH_2CH_2)_n$—O-Q-Y, wherein Q, Y, and n are as defined hereinabove.

In some embodiments, X and Y may be independently selected from the group consisting of a halide group, a mesyl group, a tosyl group, a phenoxyl group, and a substituted phenoxyl group. The activator may include, but is not limited to, $ClSO_2Cl$, $ClCOCH_2SO_2Cl$, 4-$O_2NPhOCOCl$, 2-$O_2NPhOCOCl$, $PhCOCl$, $ClSO_2CH_2CH_2SO_2Cl$, $POCl_3$, $PhOPOCl_2$, $PhPOCl_2$, $CCl_3COCl$, and $CBr_3COCl$. In preferred embodiments, the activator may be $O_2NPhOCOCl$.

In some embodiments, the reacting step may be carried out at a temperature at least about 10° C. above the melting point of the polyethylene glycol. For example, for a polyethylene glycol having the formula $M-(OCH_2CH_2)_n-O-M$ wherein M is H and n is an integer between 150 and 250, the reacting step may be carried out at a temperature in the range of about 60-90° C., preferably in the range of about 70-80° C., and more preferably at about 75° C.

The reacting step may be carried out in an atmosphere that allows the effective removal of gaseous products formed during the reaction. In some embodiments, the reacting step may be carried out in an inert gas atmosphere, e.g., under nitrogen. In alternative embodiments, the reacting step may be carried out under vacuum.

The activator may be added in a stepwise manner. In some embodiments, the process may include reacting the polyethylene glycol with two or more portions of the activator. For example, two or more portions of the activator comprising 1-199% of the equimolar amount of the polyethylene glycol may be added.

In other embodiments, the process may include reacting the polyethylene glycol with an excess of the activator. For example, the molar amount of the activator may be in 50-100% excess of the molar amount of the polyethylene glycol. In preferred embodiments, the activator may be provided in 25-75% molar excess. In particular embodiments, the activator may be provided in 33-66% molar excess.

According to another aspect of the invention, a process for preparing an activated polyethylene glycol may include the steps of providing a polyethylene glycol and reacting the polyethylene glycol with an activator in the absence of a solvent. The polyethylene glycol may have a general formula of M-$(OCH_2CH_2)_n$—O-M, while the activator may have a general formula of Y-Q-X. The activated polyethylene glycol prepared according to this aspect of the invention may have a general formula of Y-Q-$(OCH_2CH_2)_n$—O-Q-Y. The variables M, Q, X, Y, and n are as defined hereinabove.

Activated polyethylene glycols prepared by the processes described above are within the scope of the present invention. In one aspect, the activated polyethylene glycols prepared by the processes of the invention may be reacted with a molecule including a functional group that reacts with the activated polyethylene glycol to form a covalent bond. In some embodiments, the molecule may be a protein, preferably, an albumin. For example, the activated polyethylene glycols prepared by the processes of the present invention may be used to form hydrogels by mixing the activated polyethylene glycols with proteins dissolved in aqueous solutions. In some embodiments, a backing may be applied to the hydrogel to form a medical article, e.g., a wound dressing, adapted to be applied to a mammal such as a human. The activated polyethylene glycols also may be used as linkers for resins, and they may be readily linked to proteins or reacted with enzyme surfaces.

The foregoing, and other features and advantages of the invention as well as the invention itself, will be more fully understood from the following figures, description, and claims.

DETAILED DESCRIPTION

Figure 1:
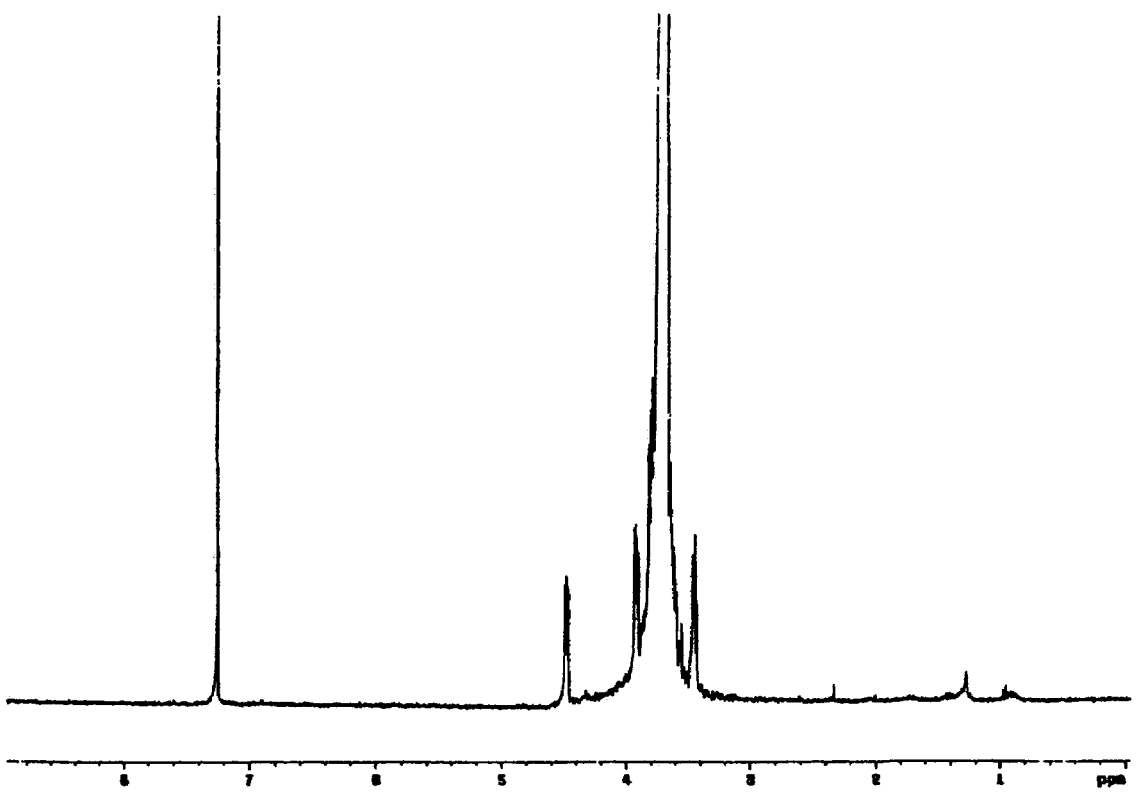
FIG. 1 is a representative $^1$H NMR spectrum of PEG-8000 that has been trifluoroacylated.

It has been discovered that activated polyethylene glycols can be prepared under solvent-free conditions. In some embodiments, the process may include reacting a molten polyethylene glycol with an activator. In other embodiments, the process may include reacting a polyethylene glycol with an activator in the absence of a solvent. The process may be carried out in an inert gas atmosphere, at a temperature at least 10° C. above the melting point of polyethylene glycol, and/or with the activator provided in molar excess of the polyethylene glycol. The invention further provides activated polyethylene glycols produced by this process and their use in a variety of pharmaceutical, medical, cosmetic and chemical applications.

As used herein, the term "lower alkyl" group refers to "$C_{1-2}$ alkyl", "$C_{1-3}$ alkyl", "$C_{1-4}$ alkyl", "$C_{1-5}$ alkyl", "$C_{1-6}$ alkyl", i.e., an alkyl group having one to two, one to three, one to four, one to five, one to six carbon atoms, respectively such as, for example, methyl, ethyl, propyl, butyl, pentyl, hexyl, and their isomeric forms thereof. The isomeric forms include "lower branched alkyl" groups as known in the art.

The term "halide" group refers to a charged or uncharged fluorine atom, a chlorine atom, a bromine atom, and/or an iodine atom.

The term "aryl" group refers to a mono- or bicyclic carbocyclic ring system having one or two aromatic rings including, but not limited to, phenyl, naphthyl, tetrahydronaphthyl, indanyl, idenyl and the like.

The term "substituted aryl" group refers to an aryl group, as defined herein, substituted by independent replacement of one, two, three, four, or five of the hydrogen atoms thereon with substituents independently selected from alkyl, substituted alkyl, haloalkyl, alkoxy, thioalkoxy, amino, alkylamino, dialkylamino, acylamino, cyano, hydroxy, halo, mercapto, nitro, carboxaldehyde, carboxy, alkoxycarbonyl and carboxamide. More specifically, the substituents may be F, Cl, Br, I, OH, $NO_2$, CN, C(O)—$C_{1-6}$ alkyl, C(O)-aryl, C(O)-heteroaryl, $CO_2$-alkyl, $CO_2$-aryl, $CO_2$-heteroaryl, C(O)$NH_2$, C(O)NH—$C_{1-6}$ alkyl, C(O)NH-aryl, C(O)NH-heteroaryl, OC(O)—$C_{1-6}$ alkyl, OC(O)-aryl, OC(O)-heteroaryl, $OCO_2$-alkyl, $OCO_2$-aryl, $OCO_2$-heteroaryl, OC(O)$NH_2$, OC(O)NH—$C_{1-6}$ alkyl, OC(O)NH-aryl, OC(O)NH-heteroaryl, NHC(O)—$C_{1-6}$ alkyl, NHC(O)-aryl, NHC(O)-heteroaryl, $NHCO_2$-alkyl, $NHCO_2$-aryl, $NHCO_2$-heteroaryl, NHC(O)$NH_2$, NHC(O)NH—$C_{1-6}$ alkyl, NHC(O)NH-aryl, NHC(O)NH-heteroaryl, $SO_2$—$C_{1-6}$ alkyl, $SO_2$-aryl, $SO_2$-heteroaryl, $SO_2NH_2$, $SO_2$NH—$C_{1-6}$ alkyl, $SO_2$NH-aryl, $SO_2$NH-heteroaryl, $C_{1-6}$ alkyl, $C_{3-6}$ cycloalkyl, $CF_3$, $CH_2CF_3$, $CHCl_2$, $CH_2OH$, $CH_2CH_2OH$, $CH_2NH_2$, $CH_2SO_2CH_3$, aryl, heteroaryl, benzyl, benzyloxy, aryloxy, heteroaryloxy, $C_{1-6}$ alkoxy, methoxymethoxy, methoxyethoxy, amino, benzylamino, arylamino, heteroarylamino, $C_{1-3}$ alkylamino, thio, aryl-thio, heteroarylthio, benzyl-thio, $C_{1-6}$ alkyl-thio, or methylthiomethyl. In addition, substituted aryl groups include tetrafluorophenyl and pentafluorophenyl.

The term "aralkyl" group refers to an aryl group attached to an alkyl group. An example of an arylalkyl group is a benzyl group.

The term "substituted aralkyl" group refers to an aryl group or substituted aryl group attached to an alkyl group or a substituted alkyl group, provided that one or both of the aryl and alkyl groups are substituted.

The term "aroxyl" group refers to an aryl group attached to an oxygen atom. An example of an aroxyl group is a phenoxyl group.

The term "substituted aroxyl" group refers to an aroxyl group or a substituted aroxyl group attached to an alkyl group or a substituted alkyl group, provided that one or both of the aroxyl and alkyl groups are substituted.

Throughout the description, where compositions are described as having, including, or comprising specific components, or where processes are described as having, including, or comprising specific process steps, it is contemplated that compositions of the present invention also consist essentially of, or consist of, the recited components, and that the processes of the present invention also consist essentially of, or consist of, the recited processing steps.

It should be understood that the order of steps or order for performing certain actions is immaterial so long as the invention remains operable. Moreover, two or more steps or actions may be conducted simultaneously.

The PEG activation process of the invention may be described by the general reaction:

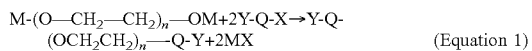

M-(O—$CH_2$—$CH_2$)$_n$—OM+2Y-Q-X→Y-Q-(O$CH_2CH_2$)$_n$—Q-Y+2MX    (Equation 1)

The unmodified polyethylene glycol has the formula M-(O—$CH_2$—$CH_2$)$_n$—OM wherein n is an integer greater than 2, and M is selected from the group consisting of H, Li, Na, K, Rb, Cs, and Fr. In preferred embodiments, M may be a hydrogen atom, and M-(O—$CH_2$—$CH_2$)$_n$—OM may be a polyethylene oxide. In certain embodiments, n may be an integer between 4 and 800. In particular embodiments, n may be an integer between 65 and 800, i.e., the unmodified PEG may have a molecular weight of about 3,000 Da to 35,000 Da. In preferred embodiments, n may be an integer between 150 and 250, corresponding to unmodified PEGs of molecular weights between 6000 and 11,000 Da.

The polyethylene glycol may be reacted with an activator of the formula Y-Q-X. X and Y independently may be a leaving group. A leaving group is an atom or group (charged or uncharged) that may be displaced from an atom in which is considered the main part of the compound. For example, a leaving group may be an anion or a neutral molecule.

Leaving groups suitable for activating polyethylene glycols as well as activators for use in methods of the invention are well known in the art and include protective groups commonly used in organic synthesis. See, e.g., J. W. Barton (1973) PROTECTIVE GROUPS IN ORGANIC CHEMISTRY, Chapter 2, Plenum Press, New York.; T. W. Greene and P. G. M. Wuts (1999) PROTECTIVE GROUPS IN ORGANIC SYNTHESIS, 3rd edition, John Wiley & Sons, Inc., New York. In preferred embodiments, X and Y may be selected from the group consisting of a halide group, a mesyl group, a tosyl group, an aroxyl group such as a phenoxyl group, and a substituted aroxyl group such as a substituted phenoxyl group.

In accordance with the formula Y-Q-X, Q may be selected from the group consisting of —$SO_2$—, —C(O)—, >P(O)—, and -A-R-B-, wherein A and B independently may be —$SO_2$—, —(O)—, or >P(O)—, and R may be selected from the group consisting of a lower alkyl group, a branched lower alkyl group, an aryl group, an aralkyl group, —$(CHR_1)_t$—, —O—$(CHR_1)_t$—O—, —S—$(CHR_1)_t$—S—, —O—$(CHR_1)_t$—S—, —S—$(CHR_1)_t$—O—, —O—$(CHR_1)_t$—$R_2C=CR_3$—$(CHR_4)_t$—O—, —S—$(CHR_1)_t$—$R_2C=CR_3$—$(CHR_4)_t$—S—, —O—$(CHR_1)_t$—$R_2C=CR_3$—$(CHR_4)_t$—S—, and —S—$(CHR_1)_t$—$R_2C=CR_3$—$(CHR_4)_t$—O—C(O)$(CHR_1)_sSO_2$—, wherein t may be an integer between 1 and 3, and $R_1$, $R_2$, $R_3$ and $R_4$ independently may be selected from the group consisting of a hydrogen group, a lower alkyl group, a branched lower alkyl group, an aryl group, and an aralkyl group. In some embodiments, $R_1$, $R_2$, $R_3$ and $R_4$ may be selected from the group consisting of a hydrogen atom, a methyl group, an ethyl group, an isopropyl group, and a propyl group. In preferred embodiments, Q may be —$SO_2$—, —C(O)—O—$CH_2$—CH=CH—$CH_2$—O—C(O)—, —C(O)$CH_2SO_2$—, —C(O)—, and —$SO_2CH_2CH_2SO_2$—. In some embodiments, Q may have the formula:

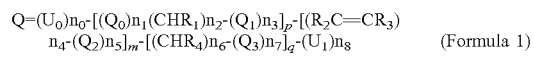

$Q=(U_0)n_0$-$[(Q_0)n_1(CHR_1)n_2$-$(Q_1)n_3]_p$-$[(R_2C=CR_3)$
$n_4$-$(Q_2)n_5]_m$-$[(CHR_4)n_6$-$(Q_3)n_7]_q$-$(U_1)n_8$    (Formula 1)

wherein $Q_0$, $Q_1$, $Q_2$, and $Q_3$ independently may be O or S; $U_0$ and $U_1$ may be independently selected from the group consisting of —C(O)—, —$SO_2$—, and >P(O)—; $n_0$, $n_1$, $n_3$, $n_4$, $n_5$, $n_7$, and $n_8$ independently may be 0 or 1; $n_2$ and $n_6$ independently may be 0, 1, 2, or 3; p and q independently may be 0, 1, 2, 3, 4, 5; or 6; and m may be 0, 1, or 2, wherein $0 \leq p+m \leq 8$. The variables $R_1$, $R_2$, $R_3$, and $R_4$ are as defined hereinabove.

The activator Y-Q-X may be capable of the in situ generation of ions including, but not limited to, acylium, sulfonium, sulfurylium and phosphonium ions.

Selected examples of preferred activators include, but are not limited to:

Cl—C(O)—$OPhNO_2$, wherein, according to Formula 1, $n_0$=1; $n_1$=$n_2$=$n_3$=$n_8$=0; p=1; m=q=0, Q=$U_0$=—C(O)—, and wherein X=Cl and Y=—$OPhNO_2$;

Cl—$SO_2OCH_2CH_2OSO_2$—Cl, wherein, according to Formula 1, $n_0$=$n_1$=$n_3$=$n_8$=1; $n_2$=2; p=1; m=q=0; $U_0$=$U_1$=$SO_2$; $Q_0$=$Q_1$=O (oxygen); $R_1$=H, Q=—$SO_2OCH_2CH_2OSO_2$— and wherein X=Y=Cl;

Cl—$SO_2OCH_2CH_2OC(O)$—Cl, wherein, according to Formula 1, $n_0$=$n_1$=$n_2$=$n_6$=$n_7$=$n_8$=1; $n_3$=0; p=q=1; m=0; $U_0$=$SO_2$; $U_1$=—C(O)—; $Q_0$=$Q_3$=O (oxygen); $R_1$ $_{=R4}$=H, Q=—$SO_2OCH_2CH_2OC(O)$—, and wherein X=Y=Cl; and Cl—C(O)O$CH_2$CH=CH$CH_2$OC(O)—Cl, wherein, according to Formula 1, $n_0$=$n_1$=$n_2$=$n_4$=$n_6$=$n_7$=$n_8$=1; $n_3$=$n_5$=0; p=m=q=1; $U_0$=$U_1$=—C(O)—; $Q_0$=$Q_3$=O (oxygen); $R_1=R_2=R_3=R_4=H$, $Q=-C(O)$ $OCH_2CH=CHCH_2OC(O)-$, and wherein $X=Y=Cl$.

Other activators may be selected from, but are not limited to, $ClSO_2Cl$, $ClC(O)CH_2SO_2Cl$, $4\text{-}O_2NPhOC(O)Cl$, $2\text{-}O_2NPhOC(O)Cl$, $PhOC(O)Cl$, $ClSO_2CH_2CH_2SO_2Cl$, $P(O)Cl_3$, $PhOP(O)Cl_2$, $PhP(O)Cl_2$, $CCl_3C(O)Cl$, and $CBr_3C(O)Cl$.

Selected examples of bis-activated PEGs having the general formula:

 (Formula 2)

include, but are not limited to:

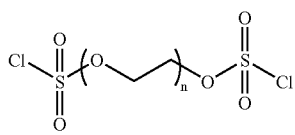

wherein Y is Cl, Q is $-SO_2-$, and n is an integer between 4 and 800, i.e. a PEG having a molecular weight from about 200 Da to 35,000 Da;

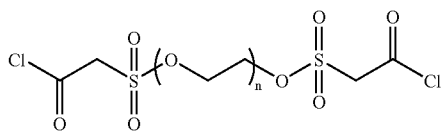

wherein Y is Cl, Q is $-C(O)CH_2SO_2-$, and n is an integer between 4 and 800, i.e. a PEG having a molecular weight from about 200 Da to 35,000 Da;

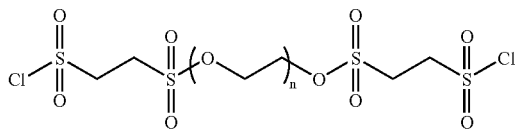

wherein Y is Cl, Q is $-SO_2CH_2CH_2SO_2-$, and n is an integer between 4 and 800, i.e. a PEG having a molecular weight from about 200 Da to 35,000 Da; and

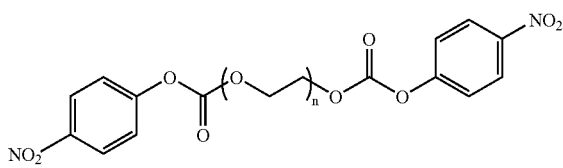

wherein Y is $4\text{-}O_2NPhO-$, Q is $-C(O)-$, and n is an integer between 4 and 800, i.e. a PEG having a molecular weight from about 200 Da to 35,000 Da.

In some embodiments of the present invention, the activation process may include reacting a molten polyethylene glycol with an activator, preferably having the formula Y-Q-X. The activation process may take place in the absence of a solvent.

A molten polyethylene glycol may be provided by heating an unmodified polyethylene glycol to or above its melting point. For example, the unmodified polyethylene glycol may be heated at a temperature range in which all, substantially all, or a significant proportion (for example, more than about 30% by weight, more than about 40% by weight, more than about 50% by weight, more than about 60% by weight, more than about 70% by weight, more than about 80% by weight, more than about 90% by weight, or more than about 95% by weight, more than about 30% by volume, more than about 40% by volume, more than about 50% by volume, more than about 60% by volume, more than about 70% by volume, more than about 80% by volume, more than about 90% by volume, or more than about 95% by volume) of the polyethylene glycol is melted. The corresponding temperature range may be, for example, from about 50° C. to about 80° C.

The reacting step may be carried out at a temperature at least about 10° C. above the melting point of the unmodified polyethylene glycol. For an unmodified PEG having a molecular weight of 8 kDa, the reacting step may be carried out at a temperature in the range of 60-90° C., preferably in the range of 70-80° C., and more preferably at 75° C.

Because hydrochloric gases or other by-products may be produced over the course of the reaction, the reacting step may be carried out in an atmosphere that allows the effective removal of the gaseous products formed during the reaction. In certain embodiments, the reacting step may be carried out in an inert gas atmosphere. For example, the reacting step may be carried out under nitrogen. In alternative embodiments, the reacting step may be carried out under vacuum.

Reaction between the unmodified polyethylene glycol and the activator may be initiated by adding a desired amount of the activator to the molten polyethylene glycol. In some embodiments, the entire amount of the activator may be added at the beginning of the reaction. In other embodiments, the activator may be added in a stepwise manner. For example, the activator may be added in two or more separate portions. Each separate portion may comprise 1-199% of the equimolar amount of the polyethylene glycol. In preferred embodiments, portions of the activator comprising about 20-60% of the equimolar amount of PEG may be added at selected time intervals. For example, portions of the activator may be added at about 1-60 minute interval(s), preferably, at about 10-40 minute interval(s), and more preferably, at about 15-minute intervals.

It was found that longer reaction times, for example two hours or more, may produce undesirable side reactions accompanied by the formation of an increased level of impurities. Accordingly, in certain embodiments, the reaction may be allowed to occur no longer than 120 minutes from the first addition of the activator. In preferred embodiments, the reaction may be allowed to occur no longer than 90 minutes from the first addition of the activator.

Additionally, it was found that a molar excess of the activator may be necessary to completely activate, or substantially completely activate, the unmodified polyethylene glycol. An activation degree of 100% indicates that a polyethylene glycol is completely activated. A substantially completely activated PEG may have an activation degree of, for example, 90-99%. In certain embodiments of the present invention, the activator may be provided in molar excess to the polyethylene glycol. For example, the molar amount of the activator may be in 100% excess of the molar amount of the polyethylene glycol. In preferred embodiments, the activator may be provided in 25-75% excess of the molar amount of the polyethylene glycol. In more preferred embodiments, the activator may be provided in 33-66% excess of the molar amount of the polyethylene glycol.

The use of excess reagents may influence the purification process of the final product. For example, it was found that free p-nitrophenols (pNP) and bis-(p-nitrophenyl carbonate)s may be present as impurities and/or by-products in the reaction system when the activator is nitrophenyl chloroformate (NPCF). Because even a small amount of these impurities are known to inhibit desirable reactions between activated PEG and proteins, the process of the invention may be followed by a purification step including the addition of activated carbon (AC) to adsorb these impurities. It was found that an approximately 10-20% weight ratio of AC:PEG may be effective in removing 90-95% of these impurities produced during the reaction. The use of activated carbon as a purification technique for the activated PEG produced by the invention is simple, cost-effective, and ecologically friendly. For example, activated carbon that has been used to purify the activated PEGs of this invention can be easily reactivated and recycled. Alternatively or complementarily, elimination of free p-nitrophenols can be achieved through deionization of the bulk activated PEG solution by means of ion-exchange technique. Anion-exchange resins in the free hydroxyl form (such as Amberlite® IRA 67 available from Sigma-Aldrich) are particularly suitable for absorption of p-nitrophenol from aqueous solutions of activated PEG. After separation via filtration or centrifugation, the anion-exchange material with absorbed impurities can be recycled and used again. The activated polyethylene glycol provided by the process of the invention may be further treated by spray-drying or lyophilization technique to improve stability and to prolong shelf life.

Activated polyethylene glycols produced by the invention may be reacted with a molecule including a functional group that reacts with the activated polyethylene glycol to form a covalent bond. Examples of such a functional group include, but are not limited to, hydroxyl groups, amine groups and thiol groups. The functional group may be derived from or forms part of a peptide, a protein, a saccharide, a polysaccharide, and/or an oligonucleotide. The formation of the covalent bond may result in the formation of a bio-polymer, which may be used in chemical, food, cosmetical, cosmeceutical, pharmaceutical, and dermopharmaceutical applications.

For example, activated polyethylene glycols prepared by the process of the invention may be used to form hydrogels by mixing the activated PEG with proteins dissolved in aqueous solutions. The activated PEG may be mixed with a protein (such as albumin, casein, hydrolyzed soy protein, or other animal-based or vegetal proteins) in an aqueous solution under basic conditions to form a three-dimensional reticulated mixture or hydrogel. See, e.g., International Publication No. WO 01/74928. In particular embodiments, the three-dimensional reticulated mixture or hydrogel may be attached to a backing, e.g., a polymer backing, to provide a medical article, such as an active ingredient delivery device, a wound cover/dressing, or a diagnostic tool. The hydrogel may be attached to the backing with or without the use of adhesives. For example, a polymer backing may be made adhesive to the hydrogel by exposing the surface of the polymer backing to an activated gas, i.e., a plasma of various gases or mixtures of gases produced by an excitation source such as microwave and radiofrequency, as described in International Publication No. WO 02/070590. Activated PEGs prepared according to the present invention also may be used as linkers for resins, and they can be readily linked to proteins or reacted with enzyme surfaces.

The following examples are provided to illustrate further and to facilitate the understanding of the invention and are not intended to limit the invention.

EXAMPLE 1

Preparation of polyethylene glycol dinitrophenyl carbonate (PEG-NPC$_2$) Via Solvent-Free, One-Time Addition Method Polyethylene glycol of molecular weight 8000 Da (PEG-8000) (Fischer Scientific, 300.0 g, 37.5 mmol) was placed in a vacuum flask equipped with a thermometer and a stirrer. Upon heating to about 65° C. to 70° C., the PEG powder began to melt. Once the PEG powder was completely melted, p-nitrophenyl chloroformate (p-NPCF) (ABCR GmbH & Co. KG, Karlsruhe, Germany, 16.6 g, 82.5 mmol, 10% molar excess) was added to the molten PEG to form a viscous solution. The reaction mixture was stirred at about 70° C. to 75° C. for three hours under vacuum or nitrogen, after which the mixture was poured onto a plastic plate to cool. The PEG-NPC$_2$ product was ground into a powder and stored refrigerated.

EXAMPLE 2

Preparation of PEG-NPC$_2$ Via Solvent-Free, Stepwise-Addition Method

PEG-NPC$_2$ was prepared similar to the method described in Example 1, except that the activator p-NPCF was added in portions. Polyethylene glycol of molecular weight 8000 Da (PEG-8000) (Fischer Scientific, 300.0 g, 37.5 mmol) was placed in a vacuum flask equipped with a thermometer and a stirrer. Upon heating to about 65° C. to 70° C., the PEG powder began to melt. Once the PEG powder was completely melted, portions of p-NPCF comprising 33% of the equimolar mount of the terminal OH groups of PEG were added to the molten PEG at 15-minute intervals until a 200% molar excess of p-NPCF was added in total. Table 1 provides the specific amount of p-NPCF added over the course of the reaction. The reaction mixture was continuously stirred for two hours at about 70° C. to 75° C., then kept under vacuum overnight to remove residual HCl vapors. The crystallized PEG-NPC$_2$ product was ground into a powder and kept refrigerated.

TABLE 1

| Amount of p-NPCF added in grams per 300 grams of PEG over time. | | |
|---|---|---|
| Time (min) | Amount of p-NPCF added (g) | Molar ratio to OH groups of PEG (%) |
| 0 | 0.0 | 0 |
| 15 | 5.0 | 33 |
| 30 | 10.0 | 67 |
| 45 | 15.0 | 100 |
| 60 | 20.0 | 133 |
| 75 | 25.0 | 167 |
| 90 | 30.0 | 200 |
| 105 | 35.0 | 233 |

EXAMPLE 3

Preparation of PEG-NPC$_2$ Via In-Solvent Method

PEG-8000 (Fischer Scientific, 363.4 g, 45.0 mmol) was dissolved in anhydrous CH$_2$Cl$_2$ (500 mL). p-NPCF (19.63 g, 97.4 mmol) dissolved in CH$_2$Cl$_2$ (50 mL) was added to the PEG solution in a 8.0 L reaction vessel upon vigorous stirring. A solution prepared with 12.2 g of DMAP dissolved in 50 ml of anhydrous CH$_2$Cl$_2$ was added to the mixture while stirring continued. The reaction mixture was kept at room temperature and stirred for another 2 hours.

The first purification step involved precipitation with cold diethyl ether (2.0 L, 4° C.). The resulting suspension was cooled in a refrigerator set at −20° C. for 30 minutes. The suspension was filtered under vacuum, and the precipitate was washed several times with cold diethyl ether. The washed precipitate was re-suspended in water, stirred vigorously for about 30 minutes, and filtered under vacuum again. The resulting yellowish filtrate was extracted with dichloromethane three times. The combined solvent fractions were filtered over Na$_2$SO$_4$ and concentrated. The resulting product was precipitated in cold diethyl ether upon vigorous stirring. The PEG-NPC$_2$ product obtained was filtered, washed with diethyl ether, and dried under vacuum.

EXAMPLE 4

Determining Activation (Substitution) Degree of PEG-NPC$_2$

A. Nuclear Magnetic Resonance

To better understand the peculiarities of the reaction, a kinetic study was conducted with activated PEG samples prepared with different stoichiometric ratios of PEG/NPCF according to the procedures described in Example 2 and Table 1. Specifically, the activation degree of these samples was measured by means of nuclear magnetic resonance spectroscopy (NMR).

$^1$H NMR spectroscopy was performed on a 300 MHz Varian type NMR instrument. Samples were placed in 5 mm NMR tubes dissolved in deuterated chloroform (CDCl$_3$). For all polymer samples, 128 scans were selected.

In this NMR study, the $^1$H NMR spectra of unmodified PEG-8000 and the integrated values of proton peaks were taken as the standard for further calculations. The signal from the hydroxyl end-groups of the unmodified PEG, however, was not resolved. To observe the signal produced by these hydroxyl groups, trifluoroacetic anhydride was added 3 hours prior to measurements. Trifluoroacetic anhydride is known to substitute hydroxyl groups with 100% efficiency. See Jo et al., *Biomacromol.*, 2: 255-261 (2001); Tessmar et al., *Biomacromol.*, 3: 194-200 (2002); Behravesh et al., *Biomacromol.*, 3: 153-158 (2002).

Figure 2:
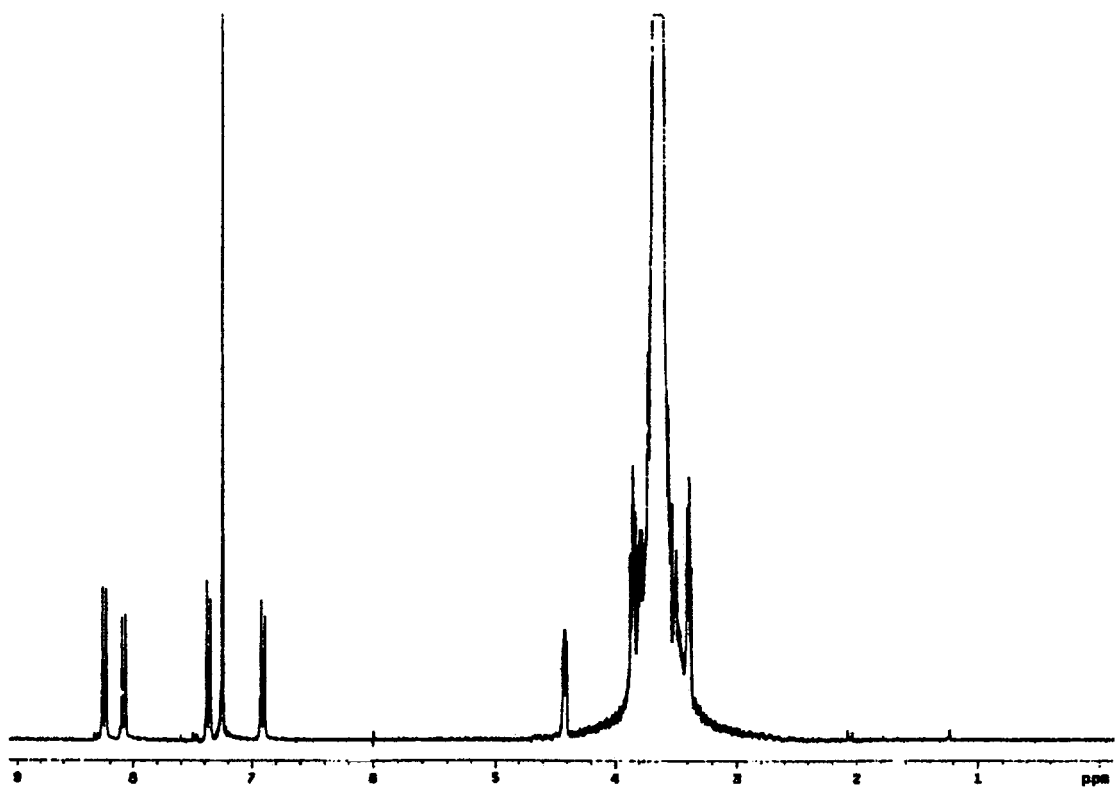
FIG. 2 is a representative $^1$H NMR spectrum of PEG-$NPC_2$ prepared according to an embodiment of the invention.
Figure 3:
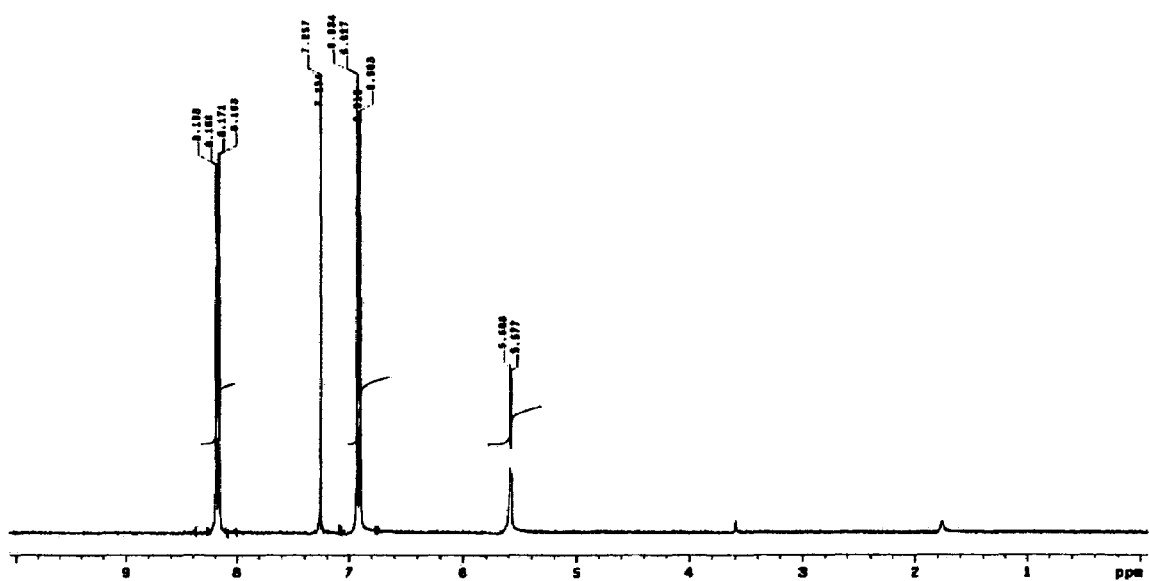
FIG. 3 is a representative $^1$H NMR spectrum of p-nitrophenol.

FIGS. 1 and 2 are representative NMR spectra of trifluoroacylated PEG and PEG-NPC$_2$, respectively. FIG. 3 is a representative NMR spectrum of p-nitrophenol (pNP). Signals observed in the NMR spectrum of PEG-NPC$_2$ (FIG. 2) were assigned by comparison with the spectra of trifluoroacylated PEG (FIG. 1) and pNP (FIG. 3). The assignment of the NMR signals of PEG-NPC$_2$ is provided in Table 2.

TABLE 2

Assignment of NMR signals of PEG-NPC$_2$.

| Signal (ppm) | Associated chemical structure |
|---|---|
| ~1.98-2.00 | Residual solvents and reactants e.g., DMAP and CH$_2$Cl$_2$ (observed only in PEG-NPC$_2$ samples prepared according to the in-solvent method) |
| ~3.6-3.8 | PEG structure associated protons (—O—CH$_2$—CH$_2$—O—)$_n$ |
| ~4.48-4.50 | Protons from methylene groups adjacent to substitution NPC—(O—CH$_2$—CH$_2$—O—)$_n$ |
| Duplet at ~6.95 and 8.10 | Free pNP molecules |
| ~7.25 | Solvent for measurement (chloroform) |
| Duplet at ~7.40 and 8.25 | NPC substitution |
| Duplet at ~7.45 and 8.25 | Impurities, presumably bis(p-nitrophenyl carbonate)s (observed only in PEG-NPC$_2$ samples prepared according to the solvent-free method) |

The substitution of the OH groups in the PEG-NPC$_2$ samples was confirmed by the singlet at 4.48 ppm. The singlet, which appears in the spectra of both trifluoroacylated PEG (FIG. 1) and PEG-NPC$_2$ (FIG. 2), was assigned to the two ethylene protons adjacent to the substituted groups. The signals at 6.95 and 8.10 ppm were assigned to free p-nitrophenol molecules produced as a by-product of the reaction. The same signals can be observed in the NMR spectrum of pNP (FIG. 3).

The ratio of the four protons of the two terminal methylene groups at 4.48-4.50 ppm to the main chain protons at 3.6-3.8 ppm was calculated from three separate spectra obtained with trifluoroacylated PEG. The estimated ratio is 4 to 820 (±5% of error). This is comparable to the theoretical ratio of 4 to 728, which was calculated as follows. Because the repeating unit of PEG has a formula molecular weight of 44, the polymerization degree (n) of a PEG macromolecule of molecular weight 8000 is about 182. Since the repeating unit comprises 4 protons, the total number of protons in the main chain is about 728 (4×182). Discrepancy in the total proton content may be attributed to small deviations in the molecular weight values from the nominal value 8000.

Based on this integral ratio of 4 to 820 (or 1 to 205) obtained from 100% trifluorosubstituted PEG, the activation degree of different PEG-NPC$_2$ samples was determined over the course of their synthesis.

Figure 4:
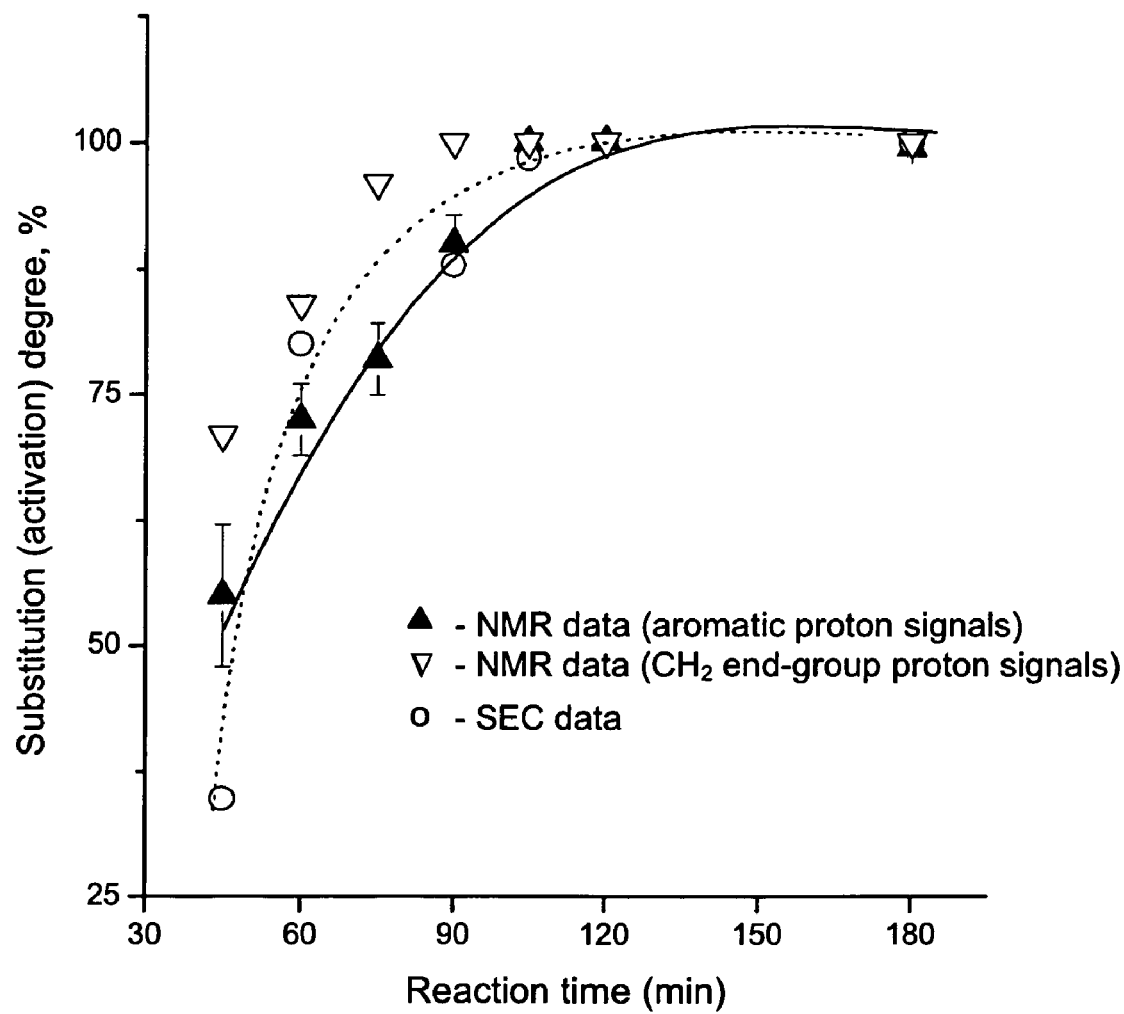
FIG. 4 shows activation degree as a function of reaction time for PEG-$NPC_2$ prepared according to an embodiment of the invention as determined by NMR and SEC. Results from two separate sets of NMR calculations are presented. One set of NMR calculations were performed with the aromatic proton signals at 7.40 and 8.25 ppm. A second set of NMR calculations were performed with the methylene end-group proton signal at 4.48 ppm.

The results are summarized in FIG. 4. It was observed that the PEG samples were fully activated (reaching an activation degree of 100%) as early as about 105 minutes into the reaction, which corresponds to the addition of 133% molar excess of p-NPCF. The NMR data also suggest that longer reaction time, i.e., more than 2 hours, could lead to undesirable side reactions and the formation of impurities, such as bis(p-nitrophenyl carbonate)s, rather than a higher activation degree.

Figure 5A:
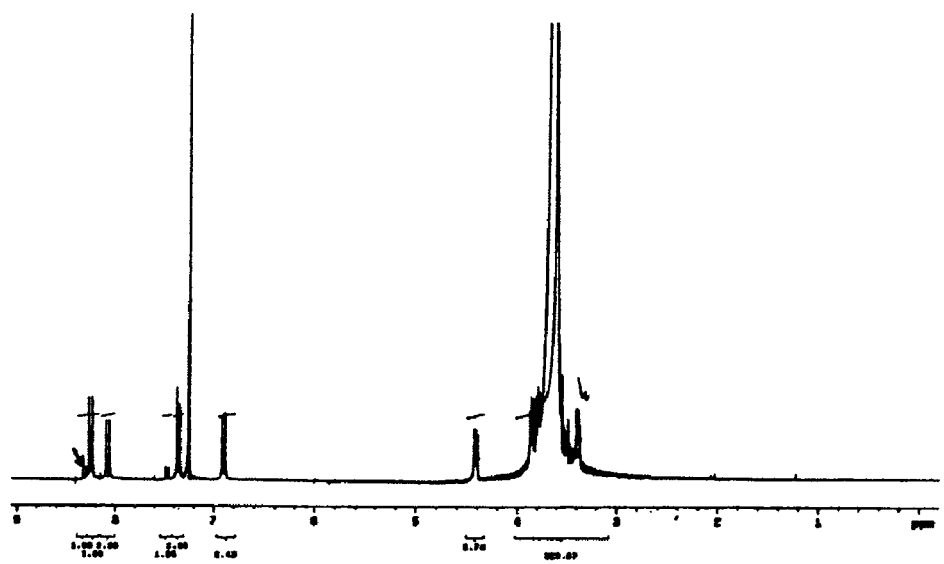
FIGS. 5A-5C are representative $^1$H NMR spectra of PEG-$NPC_2$ prepared according to an embodiment of the invention after (a) 1 hour, (b) 90 minutes, and (c) 3 hours of reaction time. Increasing signals at 7.45 and 8.25 ppm attributed to unknown impurities can be observed.
Figure 5B:
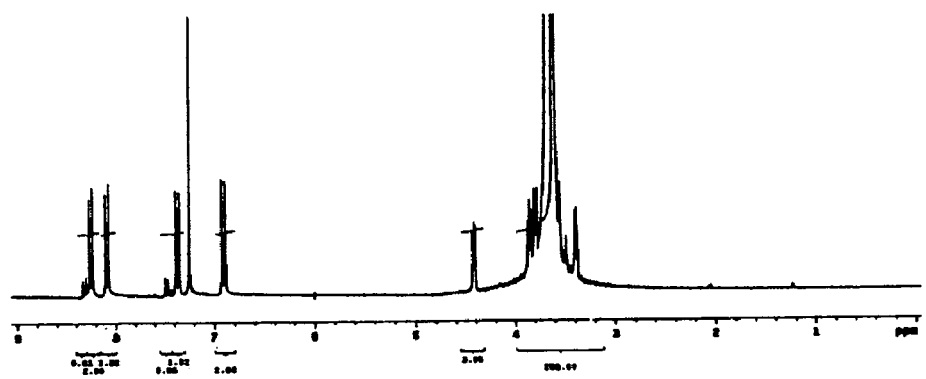
Figure 5C:
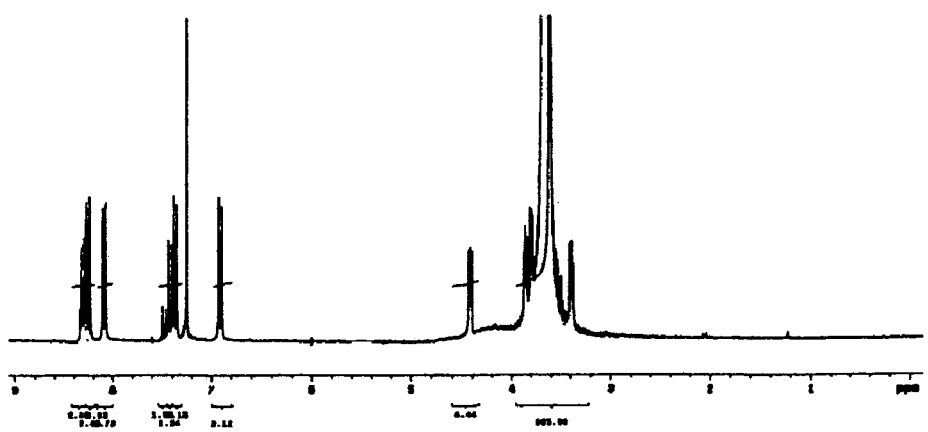

The increase in impurities level over longer reaction times can be seen more clearly in FIGS. 5A-5C, which are representative NMR spectra of PEG-NPC$_2$ samples prepared according to the solvent-free method described in Example 2 taken after (a) 1 hour, (b) 90 minutes, and (c) 3 hours of reaction time. The signal at 7.45 and 8.25 ppm, which is assigned to unknown impurities content, was observed to increase (from FIG. 5A to FIG. 5C) over longer reaction times.

To compare the effect of the different preparation methods on the degree of activation of an activated PEG sample, spectra of PEG-NPC$_2$ samples prepared by each of the methods of Examples 1, 2 and 3 were obtained. Specifically, the integral ratio of the signals at 7.40 and 8.25 ppm attributed to the aromatic protons from the nitrophenyl substituents was used to calculate the activation degree of PEG-NPC$_2$ over time. It was recognized that the appearance of the impurities signals at 7.45 and 8.25 ppm might preclude accurate measurements. To verify the accuracy of the calculations with the aromatic protons, a second set of calculations were performed with the methylene end-group proton signals at 4.48 ppm. The results are summarized in Table 3.

The PEG-NPC$_2$ samples were dissolved in water (50 mg/mL) and filtered before injection. Each injection was repeated five times for data verification purposes. Elution curves measured at 272 nm were used as chromatograms for peak area determination.

Preliminary spectrophotometry studies have shown a correlation between the intensity of the absorbance at 272 nm and the activation degree of PEG-NPC$_2$. Comparing the areas of the chromatographic peaks recorded at 272 nm for samples of known activation degree and those with unknown substitution pattern was expected to give a good estimate of the activation degree of the unknown samples. To confirm the reliability of SEC as a method for determining the activation degree of a particular PEG-NPC$_2$ sample, a chromatography analysis was performed with a PEG-NPC$_2$ sample determined to be 100% activated by the NMR technique.

Five injections of this fully activated sample were carried out to determine the correlation between the peak area of a 100%-activated PEG sample and the activation degree. Using this correlation, the peak areas obtained with 11 subsequent injections of the same sample were used to calculate the activation degree. Results are summarized in Table 4.

TABLE 3

Activation degree (AD) of activated PEG samples prepared by (i) the solvent-free, one-time addition method (Example 1), (ii) the solvent-free, stepwise addition method (Example 2), and (iii) the in-solvent method (Example 3).

| Preparation Method | Reaction Time (min) | Amount of p-NCPF added (mol %) | AD Calculated with Signals at 7.40 and 8.25 ppm (%) | AD Calculated with Signal at 4.48 ppm (%) |
|---|---|---|---|---|
| Example 1 | 60 | 110 | 63 | 37 |
| Solvent-free, one- | 120 | 110 | 65 | |
| time addition | **120 | 110 | 63 | 76 |
| method | 180 | 110 | 64 | 58 |
| | **180 | 110 | 69 | 73 |
| Example 2 | 45 | 100 | 71 | 50-60 |
| Solvent-free, | 60 | 133 | 84 | 70 |
| stepwise-addition | 75 | 167 | 96 | 76 |
| method | 90 | 200 | 100 | 88 |
| | 105 | 233 | 100 | 100 |
| | 180 | 300 | 100 | 95-98 |
| | *90 | 200 | 100 | 97-100 |
| Example 3 | 120-240 | 100-110 | 71 | 60-65 |
| In-solvent method | 120-240 | 100-110 | 88 | 80 |
| | 120-240 | 100-110 | 84 | 95 |
| | 120-240 | 100-110 | 100 | |
| | 120-240 | 100-110 | 88 | 84 |

The sample indicated by * was kept under vacuum overnight after the reaction.
Samples indicated by ** were recrystallized in acetonitrile.

The results obtained from this NMR study provide strong evidence that the solvent-free, stepwise-addition method produces activated PEG with higher activation degree than the in-solvent method. The results also show that higher activation degree may result if the activator (e.g. p-NPCF) is added in a stepwise manner (cf. the one-time addition method). Also, the reaction time needed to achieve complete activation is generally shorter for the solvent-free method than the in-solvent method, although the solvent-free method may require a larger amount of the activator (e.g., a 67% or higher molar excess).

B. Size Exclusion Chromatography

In addition to NMR spectroscopy, the activation of PEG over time was monitored by size exclusion chromatography (SEC).

The samples analyzed by means of NMR were subjected to SEC on a Waters chromatography system consisting of a quaternary pump, an autosampler and a PDA detector. A TSK 4000 PW$_{XL}$ column coupled with a pre-column was used as the separation column.

A mobile phase consisting of 0.1 M ammonium acetate in water was pumped through the column at a flow rate of 1.0 mL/min. The effluent was detected at 272 nm, which gives the maximum absorbance signal of activated PEG. Injection volume was 20 µL and the elution volume was set to 16 min. To prevent self-decomposition of the samples, the temperature of the autosampler was set to 12° C.

TABLE 4

Calibration values obtained by SEC with 100%-activated PEG samples.

| Sample Identification | Calculated activation degree (%) | Percentage deviation from nominal value (%) |
|---|---|---|
| A | 94.6 | −5.4 |
| B | 97.7 | −2.3 |
| C | 99.6 | −0.4 |
| D | 102.5 | 2.5 |
| E | 100.3 | 0.3 |
| F | 99.3 | 0.7 |
| G | 99.7 | 0.3 |

TABLE 4-continued

Calibration values obtained by SEC
with 100%-activated PEG samples.

| Sample Identification | Calculated activation degree (%) | Percentage deviation from nominal value (%) |
|---|---|---|
| H | 101.2 | 1.2 |
| I | 104.3 | 4.3 |
| J | 104.4 | 4.4 |
| K | 96.4 | −3.6 |

Mean AD, % = 100
SD(±) = 3.06
SE(±) = 0.92

As shown in Table 4, activation degree values calculated from peak area measurements show a less than 10% deviation from the nominal value. This deviation was deemed to be permissibly small, and SEC was confirmed as a reliable method. Accordingly, the activation degree of samples with unknown substitution level was determined from SEC peak area measurements.

Figure 6:
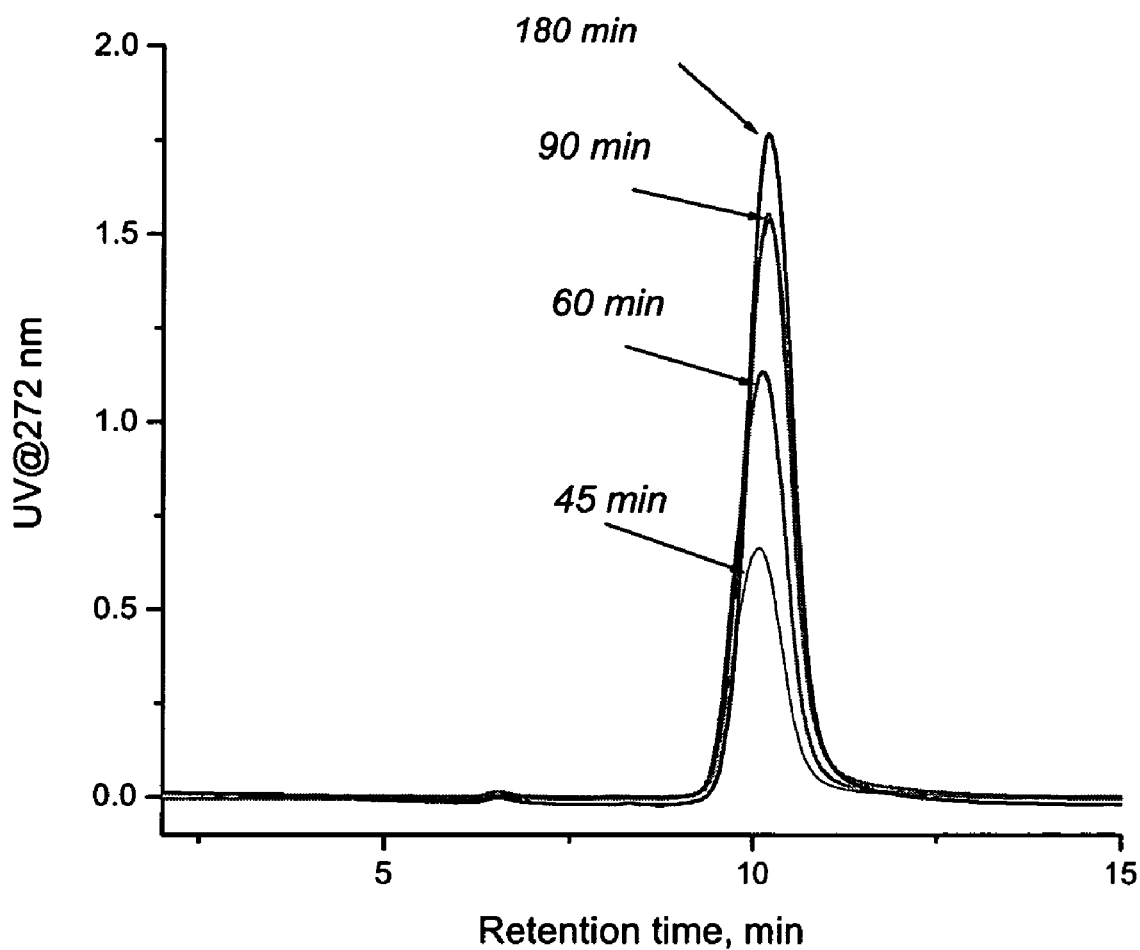
FIG. 6 shows size-exclusion chromatograms of PEG-$NPC_2$ prepared according to an embodiment of the invention after (a) 45 minutes, (b) 60 minutes, (c) 90 minutes, and (d) 180 minutes of reaction time.

FIG. 6 shows representative chromatograms of activated PEG samples obtained at 45, 60, 90, and 180 minutes into the reaction. Using peak area measurements from similar chromatograms, the activation degree of PEG-NPC$_2$ samples obtained at different reaction times was determined. The results are graphically displayed in FIG. 4, along with the calculated values from the NMR study. Both the SEC and the NMR studies suggest that 100% activation was achieved as early as about 105 minutes into the reaction and/or with about 66% molar excess of the activator p-NPCF.

Table 5 compares activation degree values calculated from the SEC measurements with those calculated with the NMR signals. The activation degree values obtained by SEC are, in most cases, comparable to those obtained by NMR, although the estimated margins of error associated with the SEC measurements are higher.

TABLE 5

Activation degree values obtained from
(i) NMR and (ii) SEC experiments.

| SAMPLE IDENTIFICATION | | ACTIVATION DEGREE (NMR) % | ACTIVATION DEGREE (SEC) % |
|---|---|---|---|
| In-solvent method | 1 | 89.5 ± 5.0 | 95.3 ± 6.9 |
| | 2 | 68.0 ± 3.0 | 74.0 ± 8.1 |
| | 3 | 84.0 ± 4.0 | 63.0 ± 10.0 |
| Solvent-free, stepwise-addition method | 4 | 95.0 ± 5.0 | 96.9 ± 5.0 |
| | 5 | 76.0 ± 4.0 | 106.7 ± 3.5 |
| | 6 | 99.0 ± 1.0 | 96.3 ± 10.9 |
| | 7 | 82.0 ± 5.0 | N/d |
| | 8 | 78.0 ± 1.0 | 89.1 ± 1.0 |

C. Melting Points

Melting points of different activated PEG samples were measured using a MeI-Temp® capillary apparatus operated in the temperature range of 20° C. to 60° C. Small amounts of the PEG-NPC$_2$ samples were placed in capillary tubes and the temperature was raised slowly. The temperature at which the PEG-NPC$_2$ powder started to turn into a viscous liquid was read as the melting temperature. Measurements were taken in triplicates.

Figure 7:
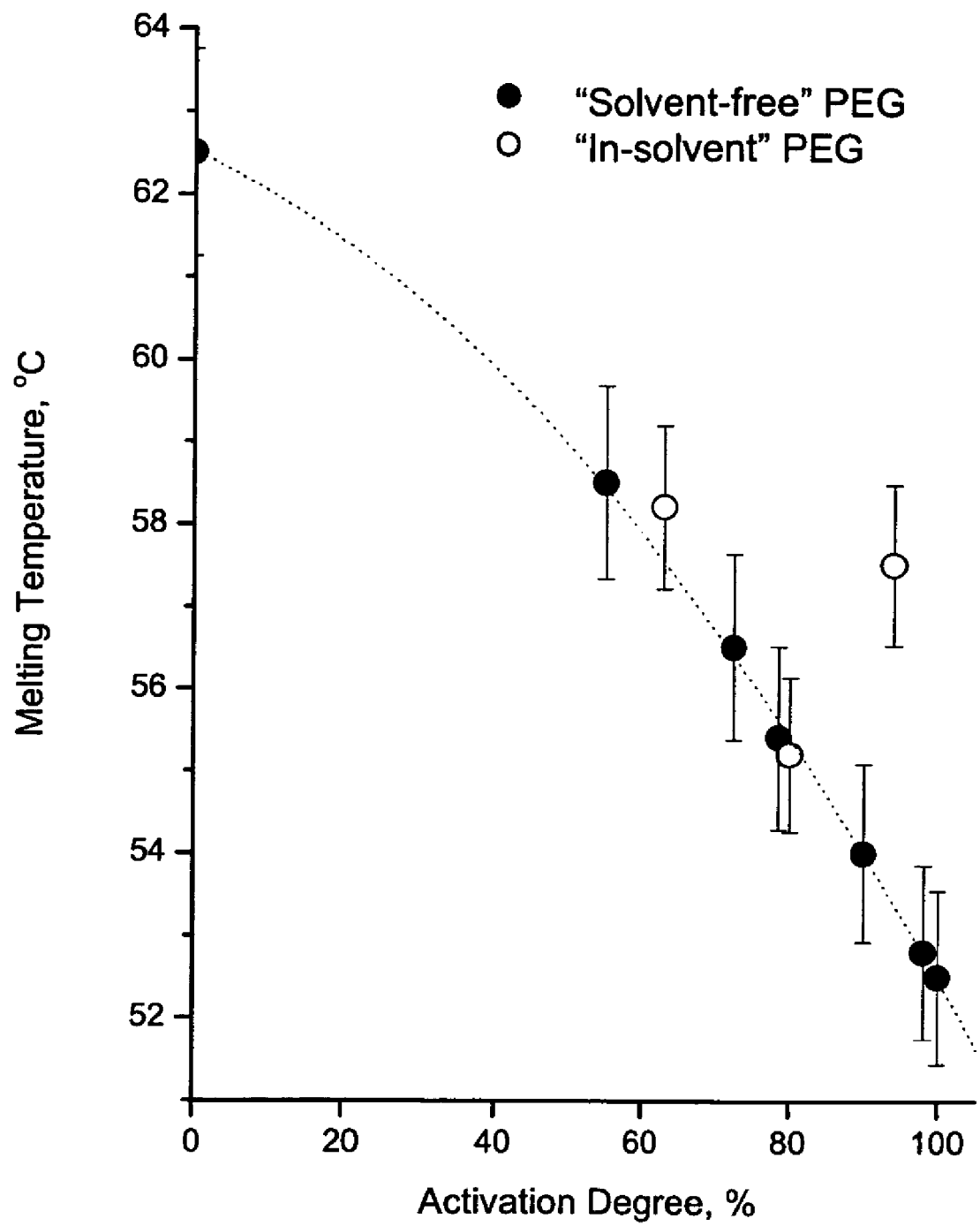
FIG. 7 shows melting point as a function of activation degree of PEG-$NPC_2$ prepared according to an embodiment of the invention and an alternative process.

FIG. 7 shows the correlation between melting temperatures and activation degree values. Data were collected from samples prepared by either the solvent-free stepwise-addition method (Example 2) or the in-solvent method (Example 3). Samples were collected at different reaction times, their respective activation degrees having been determined previously by either the NMR and/or the SEC method(s).

It was found that as the activation degree increases, the melting temperature decreases. To illustrate, an unsubstituted PEG sample was found to melt at about 62.5° C., while a 100%-activated PEG sample melted at about 52.5° C. This general trend was observed for all studied samples, irrespective of the method by which the samples were prepared. Thus the melting point of an activated PEG sample provides a good estimate of its activation degree.

The inverse correlation between the melting point and the activation degree of a PEG-NPC$_2$ sample may be explained by the imperfections introduced into the crystalline structure of the PEG molecules upon substitution of the hydroxyl end-groups with nitrophenyl groups. These imperfections reduce intermolecular friction between polymer chains and increase their mobility. Similar decrease in melting points was reported for other hydrophobically-modified PEG macromolecules. See Kim et al., *Macromol.*, 25: 8378-8384 (2002).

EXAMPLE 5

Quantification of Free pNP Content in PEG-NPC$_2$ Solutions

The amount of free pNP in PEG-NPC$_2$ samples prepared according to the method described in Example 2 was determined by high performance liquid chromatography (HPLC). HPLC analysis was performed with an HPLC system consisting of a Waters model 600E quaternary solvent delivery system, a Waters model 996 photodiode-array detector, and a Waters 717 plus autosampler. Data analysis was performed with Millennium 32.2 software. The column used was an Ace C4 reversed phase column (15 cm×4.6 mm i.d.) operated at room temperature.

HPLC analyses were carried out in isocratic mode at a flow rate of 2.0 mL/min. Elution profiles were analyzed at 317.0 nm. The mobile phase was a 0.025 M H$_3$PO$_4$ solution containing 10% (v/v) of acetonitrile. Before performing the chromatography, the mobile phase was filtered via a 0.22 μm filter.

A stock solution of pNP with a concentration of 100 μg/mL was prepared by dissolving a weighted amount of pNP (10 mg) in a 1000-mL volumetric flask. Other standard solutions of pNP with concentrations of 10.0 μg/mL, 5.0 μg/mL, 2.5 μg/mL, 1.0 μg/mL, and 0.25 μg/mL were prepared by diluting the stock 100-μg/mL pNP solution in volumetric flasks.

Weighted amounts of activated PEG samples (500 or 600 mg) were dissolved in water to achieve 5% (w/v) and 22% (w/v) solutions of the polymer. A 20 μL portion of either the 5% or the 22% solution was diluted to a total volume of 5 mL (dilution factor 250) and the diluted solution was used for HPLC analysis.

A 25-μL injection of each standard pNP solution and PEG sample solution was repeated 5 times on different days to verify intraday and interday repeatability of the detector response. The peak area of the chromatogram obtained with each standard solution was plotted against its known concentration to obtain a calibration curve. The pNP content in each diluted sample solution was determined accordingly.

The following equation was used to calculate the actual pNP concentration in each undiluted sample solution:

$$pNP, \text{mg/g } (PEG) = \frac{C_{(pNP)}HPLC, \text{μg/mL} \cdot 5 \text{ mL} \cdot 250 \text{ (dilution factor)}}{500,600 \text{ mg (weight of } PEG)} \quad \text{(Equation 2)}$$

The amount of free pNP generated over time in PEG-NPC$_2$ samples prepared by the solvent-free, stepwise-addition method (Example 2) can be found in Table 6 below.

TABLE 6

Amount of free pNP generated over time in PEG-NPC$_2$ samples prepared by the solvent-free, stepwise-addition method (Example 2).

| Time (min) | pNP (mg/g PEG) | SD (±mg/g PEG) |
|---|---|---|
| 45 | 15.25 | 0.11 |
| 60 | 18.21 | 0.09 |
| 75 | 52.51 | 0.05 |
| 90 | 37.29 | 0.15 |
| 105 | 37.72 | 0.36 |
| 120 | 16.68 | 0.31 |
| 180 | 48.11 | 3.12 |

EXAMPLE 6

Purification of the Activated PEG Product

PEG-NPC$_2$ solutions having concentrations of 5% and 22% (w/v) prepared in Example 6 were mixed with weighted amounts of activated carbon (AC). The weight ratio of AC/PEG was varied from 0.50% to 50.0%. Suspensions of activated carbon in PEG-NPC$_2$ solutions were incubated for one hour to allow maximum adsorption. Because adsorption reactions are usually exothermic, high temperatures are thought to inhibit or slow adsorption.

by-product generated by this side reaction is believed to be bis-(p-nitrophenyl carbonates).

A small amount of these impurities is known to inhibit desirable reactions between activated PEG and proteins. As many applications of activated PEG involve reactions with proteins, an effective method to remove free pNP molecules from the final activated PEG product is needed.

Activated carbon has been known for a long time as a material with an extraordinarily large surface area and pore volume that gives it a unique adsorption capacity. See Baker et al., *Activated Carbon*, KIRK-OTHMER ENCYCLOPEDIA OF CHEMICAL TECHNOLOGY, 4:1015-1037 (1992). Another important factor that makes activated carbon an ideal method to remove pNP is that it is a relatively safe substance. Activated carbon is approved by the Food and Drug Administration (FDA) as an over-the-counter drug for humans, and it is not considered a hazardous substance by the U.S. Environmental Protection Agency. The use of activated carbon to remove pNP is well documented. See Wolborska, *Wat. Res.*, 23:85-91 (1989); Haydar et al., *Carbon*, 41: 387-395 (2003); Haghseresht et al., *Energy & Fuels*, 21: 1100-1107 (1998).

It is generally agreed that the aqueous solubility of a solute is inversely related to its adsorption on carbon. As expected, the water-insoluble material observed in aqueous solutions of PEG-NPC$_2$ was effectively removed by activated carbon.

Table 7 summarizes the amount of pNP in PEG-NPC$_2$ solutions before and after purification with activated carbon.

TABLE 7

Efficiency of activated carbon (AC) in removing pNP. A 1:1 weight ratio of AC/PEG was used, i.e., 250 mg of activated carbon was added to every 250 mg of activated PEG.

| | Initial concentration | | Post-treatment concentration | | |
|---|---|---|---|---|---|
| Reaction time (min) | pNP (mg/g PEG) | SD (±mg/g PEG) | PNP (mg/g PEG) | SD (±mg/g PEG) | Efficiency of sorption (%) |
| 45 | 15.25 | 0.11 | 0.60 | 0.001 | 96.05 |
| 60 | 18.21 | 0.09 | 0.89 | 0.005 | 95.09 |
| 75 | 52.51 | 0.05 | 2.96 | 0.008 | 94.37 |
| 90 | 37.29 | 0.15 | 2.73 | 0.005 | 92.69 |
| 105 | 37.72 | 0.36 | 1.82 | 0.022 | 95.16 |
| 120 | 16.68 | 0.31 | n/d | n/d | |
| 180 | 48.11 | 3.12 | 1.82 | 0.007 | 96.22 |
| | | | | Mean Efficiency (%) | 94.93 |

Moreover, an increase in temperature may lead to degradation of the activated PEG. Accordingly, all sorption-purification procedures were carried out at room temperature.

After treatment with activated carbon, purified PEG-NPC$_2$ solutions were filtered through paper, followed by filtration with 0.22 μm or 0.45 μm membrane filters, and subjected to lypophilization.

At least two different types of impurities were observed in the PEG-NPC$_2$ samples prepared by the solvent-free method. One of the impurities is free p-nitrophenol (pNP) generated by side reactoins in the molten PEG-p-NPCF system. The other impurity is believed to be bis-(p-nitrophenyl carbonate)s, a water insoluble material that makes the PEG-NPC$_2$ solution prepared by the solvent-free method milky. pNP may be present as an impurity in the commercially obtained p-NPCF starting material, or it may be a degradation by-product of the activator. It is believed that one of the side reactions involves a reaction between the pNP so formed and the starting material p-NPCF. The The efficiency of activated carbon in removing pNP was calculated by the following equation:

$$\text{Efficiency, \%} = \frac{pNP_{Initial} - pNP_{after\ treatment}}{pNP_{Initial}} \cdot 100\% \quad \text{(Equation 3)}$$

As seen from the results summarized in Table 7, a 1:1 weight ratio of activated carbon to PEG-NPC$_2$ had proven to be highly efficient in removing residual pNP. The efficiency of purification was observed to be about 95% for all studied concentrations of pNP (15-48 mg/g) in PEG-NPC$_2$ solutions, suggesting that a smaller amount of activated carbon may be used and still be effective.

Additional experiments were performed on 22% (w/v) activated PEG solutions to determine the optimal the optimal AC/PEG ratio for removing 90-95% of free pNP. To these solutions were added the following amounts of activated carbon: 0.5, 2.5, 5.0, 10.0, 20.0 and 50.0% (w/w) (Table 8). The resulting mixture was continuously stirred for an hour to allow maximum

TABLE 8

Activated carbon/PEG-NPC$_2$ weight ratio used to purify PEG-NPC$_2$.

| PEG CONCENTRATION, (mg/mL) | Weight of polymer (mg) | Activated carbon added (mg) | Act. Carbon/ PEG ratio (%) |
|---|---|---|---|
| 220 | 1100 | 5.5 | 0.5 |
| 220 | 1100 | 27.5 | 2.5 |
| 220 | 1100 | 55.0 | 5.0 |
| 220 | 1100 | 110.0 | 10.0 |
| 220 | 1100 | 220.0 | 20.0 |
| 220 | 1100 | 550.0 | 50.0 |

Figure 8:
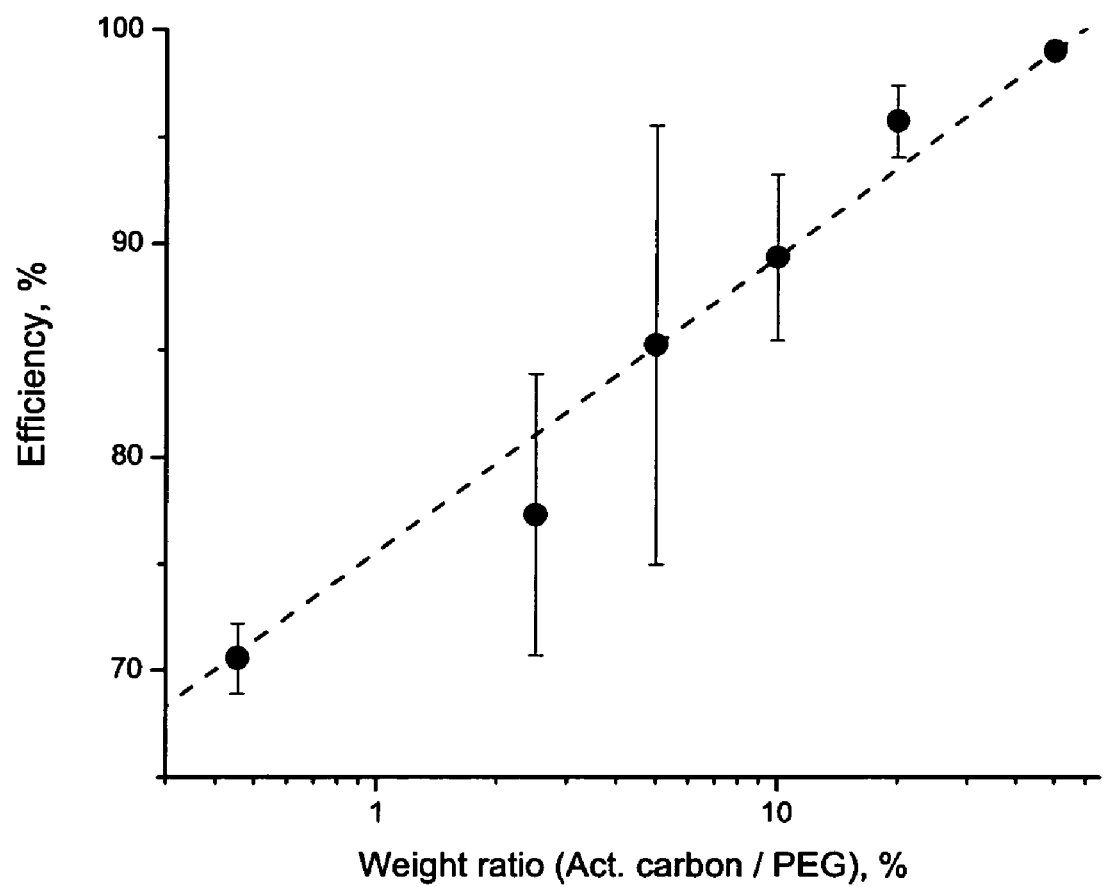
FIG. 8 shows the efficiency of activated carbon sorption of p-nitrophenol in aqueous solutions of activated PEG with a polymer concentration of 22% (w/v).

HPLC analysis was performed to quantify the pNP level in PEG-NPC$_2$ samples before and after treatment with activated carbon. Procedures were described in Example 6. The efficiency of the treatment was determined by Equation 3, and the results are graphically; displayed in FIG. 8.

It was found that the efficiency of sorption increases with the amount of activated carbon added. pNP was 100% removed with a 50% weight ratio of AC/PEG-NPC$_2$. However, it can be seen from FIG. 8 that even a 5-10% weight ratio of activated carbon was sufficient to remove up to 90-95% of pNP.

It is known that the adsorption amount is dependent upon the concentration of the adsorbent, temperature of the solution, and the polarity of the adsorbent.

Usually, the isotherm of activated carbon sorption is described by the Freundlich function given below:

$$\frac{pNP \text{ (mg)}}{AC \text{ (mg)}} = K_f C_e^{\frac{1}{n}}, \quad \text{(Equation 4)}$$

where pNP (mg)/AC (mg) is the amount of pNP adsorbed per milligram of activated carbon, $C_e$ is the concentration of pNP at equilibrium after absorption, $K_f$ is an absorbent capacity constant, and n is a characteristic constant of the absorbent surface. See Ko et al., *Carbon*, 40, 14: 2661-2672 (2002).

Figure 9:
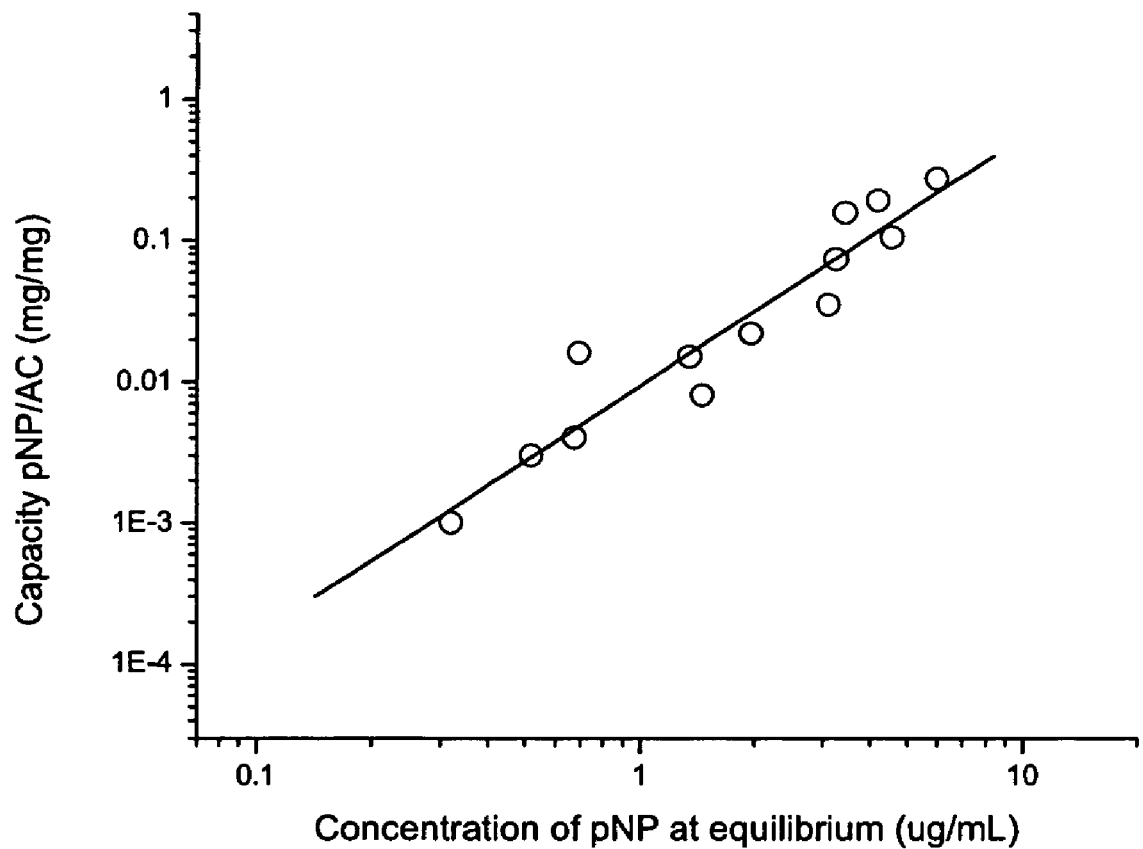
FIG. 9 shows the correlation between the adsorption capacity of activated carbon and the concentration of p-nitrophenol at equilibrium.

Data from Table 8 were substituted into Equation 4. The corresponding plot was given in FIG. 9. A linear correlation was observed when sorption capacity (pNP (mg)/AC (mg)) was plotted against $C_e$ in double log coordinates in an AC concentration range of 27.5-550 mg/mL. The parameter $K_f$ was determined to be $K_f$=0.01 mL/mg and n=0.493, indicating good realization of sorption properties of activated carbon when applied to a relatively concentrated PEG-NPC$_2$ solution. The Freundlich function, however, gives very little information about the optimal concentration of activated carbon to be used.

To estimate the optimal range of AC concentration, the following equation is used to calculate a specific sorption parameter:

$$\text{Specific sorption:} \quad \frac{d\,pNP \text{ absorbed (mg)}}{d\,AC \text{ added (mg)}} \quad \text{(Equation 5)}$$

Figure 10:
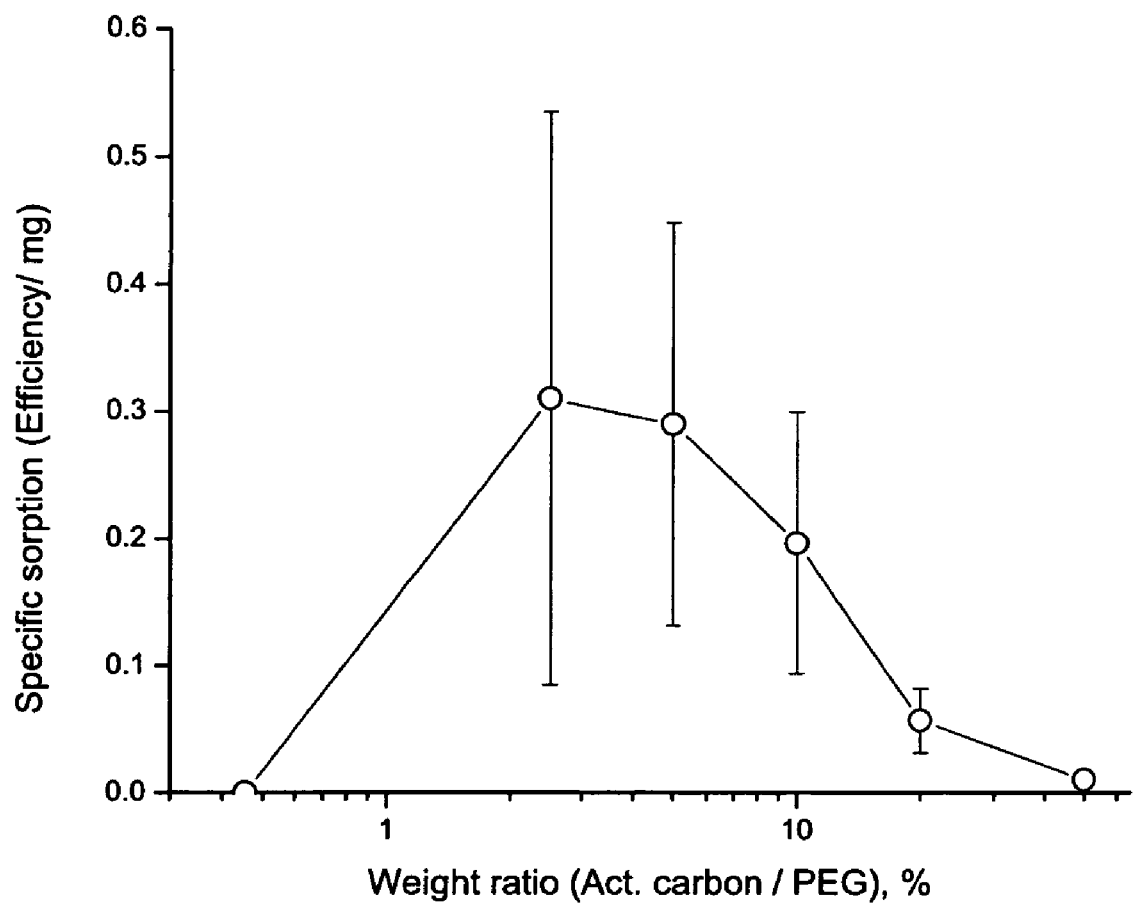
FIG. 10 shows specific sorption as a function of weight ratio with regard to the adsorption of p-nitrophenol by activated carbon in aqueous solutions of activated PEG with a polymer concentration of 22% (w/v).

The specific sorption value given by Equation 5 indicates the increased amount of pNP absorbed per mg of carbon added. The calculated specific sorption values are plotted against the weight ratio of AC/PEG in FIG. 10. The optimal amount of activated carbon to be added per mg of PEG-NPC$_2$ to remove 90-95% of free pNP corresponds to the sharpest curve in the plot, which was found to be between 10-20% (w/w) of AC/PEG.

The impurities mentioned above also may be removed by means of ion-exchange, followed by filtration of the purified polymer solutions through 0.22 μm membrane filter. Ion-exchange resins are known to be an efficient means to absorb nitrophenolic compounds from aqueous environment (see Ku et al., *J. Hazard. Mater.*, 80: 59-68 (2000); Li et al., *J. Environ. Sci.* (China), 14: 457-463 (2002); Abburi et al., *J. Hazard. Mater.*, 105: 143-156 (2003); and Calace et al., *Environ. Pollut.*, 118: 315-319 (2002)), whereas microfiltration helps to remove insoluble particles of bis-(p-nitrophenyl carbonates).

Analysis of pNP in the PEG-NPC$_2$ samples prepared and purified according to the method described in Example 5C, shows that the amount of pNP decreases significantly upon deionization of the polymer solution via ion-exchange treatment. Table 9 summarizes these results.

TABLE 9

Amount of pNP in PEG-NPC$_2$ samples prepared according to the method described in Example 5C.

| PEG-NPC2 Samples | Amount of pNP before ion-exchange (mg/g) ± SD (mg/g) | Amount of pNP after ion-exchange (mg/g) ± SD (mg/g) |
|---|---|---|
| A | 19.44 ± 0.05 | 10.60 ± 0.08 |
| B | 19.44 ± 0.05 | 12.71 ± 0.01 |
| C | 17.33 ± 0.15 | n/d |

Both the ion-exchange and active carbon treatments are by far less expensive and less polluting than traditional techniques using organic solvents to recover and purify polymer (see, e.g., Example 3). To obtain highly purified activated PEG, one may treat raw activated PEG products first with ion-exchange resins, followed by further purification with activated carbon.

EXAMPLE 8

Lyophilization of Purified PEG Solutions

Clear colourless or slightly yellowish solutions of PEG-NPC$_2$ with a concentration of 22% (w/v) or 30% (w/v), prepared according to the procedures described in Example 6, were transferred into freeze-dryer flasks. The solutions were cooled to −40° C. in rotatory shell freezer filled with 70% ethanol in water. The freeze-dryer flasks containing the frozen PEG solutions were then connected to the vacuum lines of a freeze-dryer (Labconco) connected to a condensation camera stabilized at −40° C. to −50° C. The frozen PEG solutions were dried for 24 to 48 hours.

EXAMPLE 9

Influence of Purification and Neutralization Techniques on Activation Degree of Activated PEG A. Preparation of PEG-NPC$_2$ PEG-8000 (Fisher Scientific, 1000 g, 125 mmol) was placed in a reactor equipped with a thermometer and a mechanical stirrer. The reaction system was thermostabilized at 70° C. Vacuum was applied upon continuous stirring to remove air from the system. Once the PEG powder was completely melted, p-NPCF (ABCR GmbH & Co. KG, Karlsruhe, Germany, 15.0 g, 74.5 mmol) was added to the molten PEG. The reaction mixture was incubated under vacuum for 30 minutes. More p-NPCF was added in 15-gram portions at 30-min intervals until a 60% molar excess of p-NPCF had been added (i.e., 75 g of p-NPCF per 1000 g of PEG). The reaction mixture was stirred at 70° C. for two hours to remove residual HCl vapors. The PEG-NPC$_2$ melt was transferred into 4.5 L of cold distilled water, and dissolved to provide a 22 wt. % aqueous solution. The resultant aqueous solution was divided into 3 samples and subjected to three different purification methods as detailed below.

B. Purification with Activated Carbon

Activated carbon (33 g, 10 wt. % of PEG-NPC$_2$) was added to a first sample of the PEG-NPC$_2$ aqueous solution obtained from Part A. The mixture was filtered and lyophilized to provide purified non-neutralized PEG-NPC$_2$.

C. Purification with Anion-Exchange Resin

A second sample of the PEG-NPC$_2$ aqueous solution obtained from Part A was treated with anion-exchange resin (Amberlite® IRA-67, 33 g, 10 wt. % of PEG-NPC$_2$) to remove residual HCl. Once the pH of the activated PEG solution reached 5.0, the solution was filtered and freeze-dried to give purified deionized PEG-NPC$_2$.

D. Neutralization with NaOH

An aqueous solution of 6N NaOH was added to a third sample of the PEG-NPC$_2$ aqueous solution obtained from Part A to adjust the pH value to 5.5. The solution was filtered and dried to give purified neutralized PEG-NPC$_2$.

E. Activation Degree as Determined by SEC

It was found that different purification and neutralization techniques could affect the activation degree of the final activated PEG product. Table 10 compares the activation degree of PEG-NPC$_2$ samples purified and/or neutralized according to the three techniques described in Parts B-D above, as determined by SEC.

TABLE 10

Influence of purification/neutralization technique on activation degree.

| PEG-NPC$_2$ Samples | pH value of 22% PEG-NPC$_2$ solution | Activation degree Average (%) | Deviation from initial value before purification/ neutralization (%) |
|---|---|---|---|
| Purified non-neutralized (Part B) | 2.3 | 97.76 | 0 |
| Purified deionized (Part C) | 5.2 | 95.24 | −2.6 |
| Purified neutralized (Part D) | 5.7 | 86.08 | −11.95 |

As shown by the results in Table 10, when an activated PEG sample was neutralized with NaOH, its activation degree decreased. This can be explained by the effect of local hydrolysis of the carbonate linkages in at least some of the PEG-NPC$_2$ molecules by the strong base NaOH.

In contrast, the ion-exchange treatment proceeds under much milder conditions, thus helping to preserve the initial degree of substitution. The results in Table 10 show that only 2.6% of the substitution was lost upon neutralization via ion exchange. The resultant polymer is referred to as purified deionized activated PEG, since Cl$^-$ ions from HCl are replaced by OH$^-$ ions upon ion exchange, resulting in the formation of water molecules.

EXAMPLE 10

Synthesis of PEG-Protein hydrogel

PEG-NPC$_2$ (5.5 g) prepared according to the method described in Example 2 were added to 25 mL of deionized water. Hydrolyzed soy protein, casein, and soy albumin, respectively, was dissolved in 0.14M NaOH to give 12% (w/v) (120 mg/mL) protein solutions. The pH of the protein solutions was adjusted to 11.80. The polymer solutions were mixed with equal volume of one of the protein solutions, and the mixture was placed between two pieces of glass to form a gel with a thickness of 1.8 mm. The resulting hydrogel samples (PEG-protein hydrogels) were washed in EDTA/NaCl buffer to remove residual pNP.

Completely swollen hydrogel samples were observed to be a transparent to opaque rubbery material. No visible differences were observed between samples obtained with solvent-free activated PEG (i.e., prepared according to the procedures described in Example 2) and those obtained with in-solvent activated PEG (i.e., prepared according to the procedures described in Example 3).

Compression tests were performed to compare the mechanical properties of hydrogels prepared by solvent-free activated PEG and in-solvent activated PEG. The results suggested that the mechanical properties of hydrogels made with either solvent-free or in-solvent activated PEGs are similar when the hydrogels were prepared with the same protein solutions. Other physicochemical properties of the hydrogels, such as their equilibrium water content, also seem to be unaffected by the procedure by which the activated PEG was prepared.

Variations, modifications, and other implementations of what is described herein will occur to those of ordinary skill in the art without departing from the spirit and the essential characteristics of the invention. Accordingly, the scope of the invention is to be defined not by the preceding illustrative description but instead by the following claims, and all changes that come within the meaning and range of equivalency of the claims are intended to be embraced therein.

Each of the patent documents and scientific publications disclosed hereinabove is incorporated by reference herein for all purposes.

What is claimed is:

1. A method for preparing an activated polyethylene glycol having the formula:

Y-Q-(OCH$_2$CH$_2$)$_n$—O-Q-Y wherein:
Q is C(O);
Y is a leaving group; and
n is an integer greater than 2;
the method comprising:
providing a polyethylene glycol having the formula:

M-(OCH$_2$CH$_2$)$_n$—O-M wherein:
M is selected from H, Li, Na, K, Rb, and Cs; and
n is as defined above; and
reacting in the absence of a solvent the polyethylene glycol with an activator having the formula:

Y-Q-X wherein:
X is a leaving group; and
Q and Y are as defined above;
wherein the reaction is carried out in the absence of a base.

2. The method of claim 1 wherein Y is selected from a halide group, a mesyl group, a tosyl group, a phenoxyl group, and a substituted phenoxyl group.

3. The method of claim 2 wherein X is selected from a halide group, a mesyl group, a tosyl group, a phenoxyl group, and a substituted phenoxyl group.

4. The method of claim 1 wherein M is H.

5. The method of claim 1 wherein the activator is O$_2$NPhOC(O)Cl.

6. The method of claim 1 wherein M is H, n is an integer between 150 and 250, and the reacting step is carried out at a temperature in the range of about 60-90° C.

7. The method of claim 1 wherein the molar amount of the activator is in excess of the molar amount of the polyethylene glycol.

8. The method of claim 1 wherein the molar excess is between about 50-100%.

9. The method of claim 1, wherein the polyethylene glycol is reacted with the activator for less than or about two hours.

10. The method of claim 1, wherein the activated polyethylene glycol has an activation degree of greater than or about 90%.

11. The method of claim 1, comprising contacting the activated polyethylene glycol with ion exchange resins.

12. A method for preparing an activated polyethylene glycol having the formula:

Y-Q-(OCH$_2$CH$_2$)$_n$—O-Q-Y wherein:
Q is —C(O)—;
Y is a leaving group; and
n is an integer greater than 2;
the method comprising:
providing a polyethylene glycol having the formula:

M-(OCH$_2$CH$_2$)$_n$—O-M wherein:
M is selected from H, Li, Na, K, Rb, and Cs; and
n is as defined above; and
reacting in the absence of a solvent the polyethylene glycol with an activator having the formula:

Y-Q-X wherein
X is a leaving group; and
Q and Y are as defined above;
wherein the polyethylene glycol is reacted with the activator for less than or about two hours.

13. The method of claim 12, wherein M is H and n is an integer between 150 and 250.

14. The method of claim 12, wherein the activator is O$_2$NPhOC(O)Cl.

15. The method of claim 12, wherein the molar amount of the activator is in excess of the molar amount of the polyethylene glycol.

16. The method of claim 12, wherein the activated polyethylene glycol has an activation degree of greater than or about 90%.

17. The method of claim 12, comprising contacting the activated polyethylene glycol with ion exchange resins.

18. A method for preparing an activated polyethylene glycol having the formula:

Y-Q-(OCH$_2$CH$_2$)$_n$—O-Q-Y wherein:
Q is —C(O)—;
Y is a leaving group; and
n is an integer greater than 2;
the method comprising:
providing a polyethylene glycol having the formula:

M-(OCH$_2$CH$_2$)$_n$—O-M wherein:
M is selected from H, Li, Na, K, Rb, and Cs; and
n is as defined above;
reacting in the absence of a solvent the polyethylene glycol with an activator having the formula:

Y-Q-X wherein
X is a leaving group; and
Q and Y are as defined above; and
contacting the activated polyethylene glycol with ion exchange resins.

19. The method of claim 18, wherein M is H and n is an integer between 150 and 250.

20. The method of claim 18, wherein the activator is O$_2$NPhOC(O)Cl.

* * * * *